(12) United States Patent
Toyota et al.

(10) Patent No.: US 11,444,942 B2
(45) Date of Patent: Sep. 13, 2022

(54) INFORMATION PROCESSING APPARATUS, INFORMATION PROCESSING SYSTEM, INFORMATION PROCESSING METHOD, AND RECORDING MEDIUM

(71) Applicants: Yukinari Toyota, Kanagawa (JP); Shigeo Araki, Kanagawa (JP)

(72) Inventors: Yukinari Toyota, Kanagawa (JP); Shigeo Araki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 16/846,777

(22) Filed: Apr. 13, 2020

(65) Prior Publication Data

US 2020/0344228 A1  Oct. 29, 2020

(30) Foreign Application Priority Data

Apr. 26, 2019  (JP) .............................. JP2019-085983

(51) Int. Cl.
| | |
|---|---|
| *G06F 3/048* | (2013.01) |
| *H04L 9/40* | (2022.01) |
| *G06Q 10/10* | (2012.01) |
| *G06F 3/14* | (2006.01) |
| *H04L 12/18* | (2006.01) |

(52) U.S. Cl.
CPC ........ *H04L 63/0861* (2013.01); *G06F 3/1454* (2013.01); *G06Q 10/1095* (2013.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 2009/0327227 A1* | 12/2009 | Chakra | ............... | H04L 12/1818 |
| 2011/0040834 A1* | 2/2011 | Schaefer | .............. | G06Q 10/109 |
| | | | | 709/204 |
| 2013/0041953 A1* | 2/2013 | Renner | ................. | H04M 3/563 |
| | | | | 709/204 |

(Continued)

FOREIGN PATENT DOCUMENTS

| | | |
|---|---|---|
| JP | 2006-005590 | 1/2006 |
| JP | 2016-139322 | 8/2016 |
| JP | 2017-091559 | 5/2017 |

OTHER PUBLICATIONS

U.S. Appl. No. 16/676,682, filed Nov. 7, 2019 Shigeo Araki.

*Primary Examiner* — William C Trapanese
(74) *Attorney, Agent, or Firm* — IPUSA, PLLC

(57) ABSTRACT

An information processing apparatus includes circuitry to: in response to detection of information identifying a user, acquire schedule information on the user from an external service, using external service setting information associated with the information identifying the user; when the user is to set a schedule for using the information processing apparatus, suggest the user with a schedule for using the information processing apparatus based on a current time, to cause the user to set the schedule for using the information processing apparatus; obtain information on an expected attendee registered for the schedule for using the information processing apparatus set by the user, based on the schedule information on the user; and transmit image data of an image being displayed on a display to the expected attendee.

8 Claims, 28 Drawing Sheets

(56) References Cited

U.S. PATENT DOCUMENTS

| | | |
|---|---|---|
| 2017/0315793 A1 | 11/2017 | Kanematsu |
| 2019/0020770 A1 | 1/2019 | Araki |
| 2019/0235735 A1 | 8/2019 | Toyota et al. |
| 2019/0239069 A1 | 8/2019 | Toyota |
| 2019/0384536 A1 | 12/2019 | Araki |
| 2019/0387033 A1 | 12/2019 | Araki |
| 2020/0302344 A1* | 9/2020 | Just .......................... G06F 21/34 |
| 2020/0342416 A1* | 10/2020 | Bregman ................ G06F 21/31 |

* cited by examiner

FIG. 5

ACCOUNT INFORMATION FOR USER SERVICE IN EXTERNAL SERVICE GROUP SYSTEM A

| USER ID | NAME | MAIL ADDRESS |
|---------|------|--------------|
| office1 | Mary | office1@office.example.com |
| office2 | Sato | office2@office.example.com |
| ... | ... | ... |

FIG. 6

SCHEDULE INFORMATION FOR SCHEDULE SERVICE IN EXTERNAL SERVICE GROUP SYSTEM A

| SCHED-ULE ID | SCHEDULE NAME | SCHED-ULE TYPE | OWNER USER | START TIME AND PERIOD | EXPECTED ATTENDEE | ATTACHED FILE |
|---|---|---|---|---|---|---|
| sch-1 | MEETING WITH COMPANY A | CONFERENCE | office 1 | 2010-04-05 10:00-12:00 | office1 (Mary <office1@office.example.com>), office2 (Sato <office2@office.example.com>) | a01.doc |
| sch-2 | PROGRESS CONFERENCE BY SALES DIVISION | CONFERENCE | office 1 | 2010-04-05 13:00-14:00 | office3 (Motoko office3@office.example.com) | |

FIG. 7

USER INFORMATION LIST

| USER ID | NAME | MAIL ADDRESS | EXTERNAL SERVICE SETTING ID | IDENTIFICATION INFORMATION |
|---|---|---|---|---|
| user001 | Mary Smith | mary@intra.example.com | connect1a | ICCARD-123 |
| user002 | Sato Suzuki | sato@intra.example.com | connect2a | ICCARD-248 |
| ... | ... | ... | ... | ... |

FIG. 8

EXTERNAL SERVICE SETTING INFORMATION

| EXTERNAL SERVICE SETTING ID | USER ID | ADDRESS INFORMATION | USER ID FOR EXTERNAL SERVICE | AUTHENTICATION TOKEN FOR EXTERNAL SERVICE |
|---|---|---|---|---|
| connet1a | user001 | office.example.com | office1 | eyJhbGc11··· |
| connet2a | user002 | office.example.com | office2 | eyJhbGc12··· |
| ... | ... | ... | ... | ... |

FIG. 9

ATTENDEE MANAGEMENT INFORMATION LIST
(IMMEDIATELY AFTER START OF CONFERENCE)

| USER ID |
|---|
| user001 |

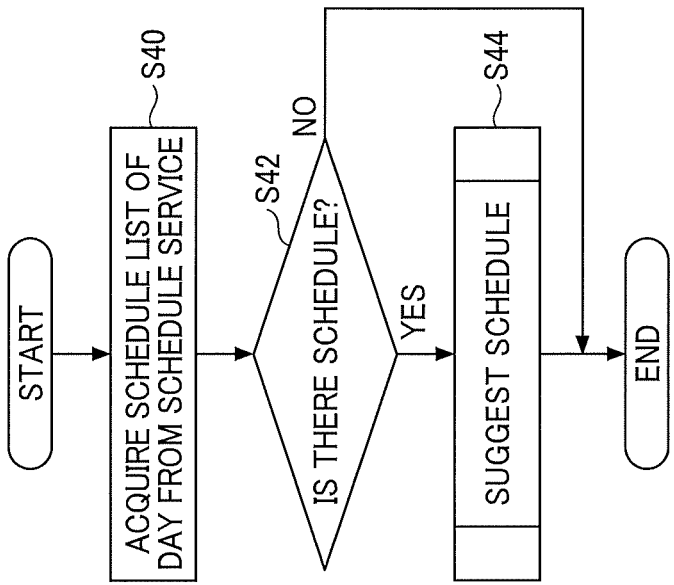
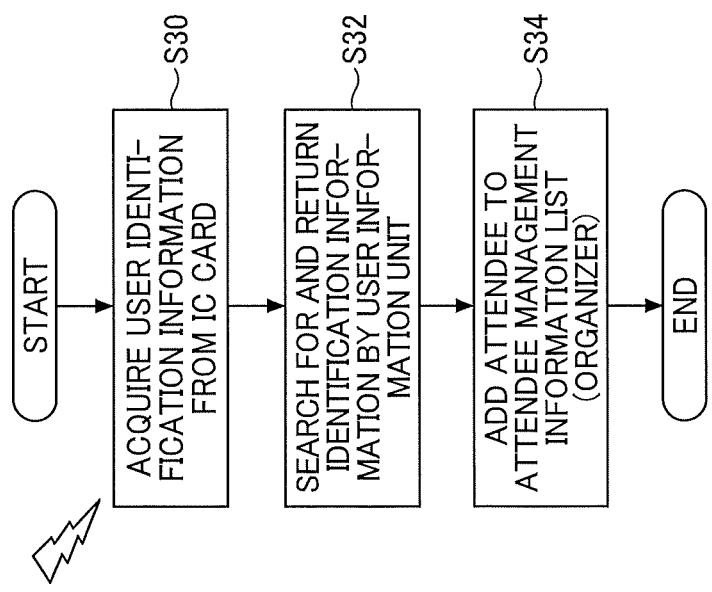

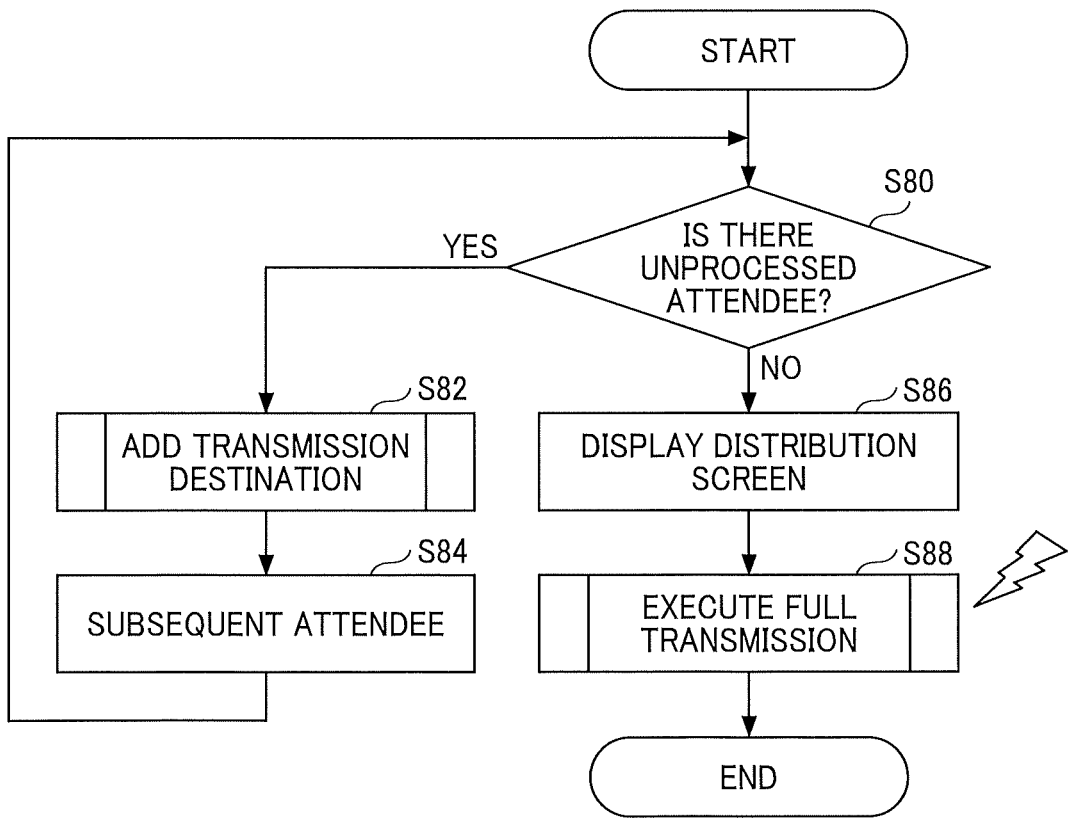

SCHEDULE INFORMATION FOR SCHEDULE SERVICE IN EXTERNAL SERVICE GROUP SYSTEM A (AFTER CONFERENCE, ABSTRACT)

| SCHED-ULE ID | SCHEDULE NAME | OWNER USER | ATTACHED FILE |
|---|---|---|---|
| sch-1 | MEETING WITH COMPANY A | office1 | a01.doc<br>MEETING WITH COMPANY A_20100405.pdf |
| sch-2 | PROGRESS CONFERENCE BY SALES DIVISION | office2 | |

FIG. 26

ACCOUNT INFORMATION FOR USER SERVICE IN EXTERNAL SERVICE GROUP SYSTEM A

| USER ID | NAME | MAIL ADDRESS |
|---|---|---|
| office1 | Mary | office1@office.example.com |
| office2 | Sato | office2@office.example.com |
| office3 | Saito | office3@office.example.com |
| office4 | Suzuki | office4@office.example.com |
| office5 | Itoh | office5@office.example.com |
| ... | ... | ... |

FIG. 27

SCHEDULE INFORMATION FOR SCHEDULE SERVICE IN EXTERNAL SERVICE GROUP SYSTEM A

| SCHED-ULE ID | SCHEDULE NAME | SCHEDULE TYPE | OWNER USER | START TIME AND PERIOD | EXPECTED ATTENDEE | ATTACHED FILE |
|---|---|---|---|---|---|---|
| sch-1 | DEMONSTRA-TION DOCUMENT CREATION | CONFER-ENCE | office1 | 2018-11-12 15:00-16:00 | office1 (Mary <office1@office.example.com>), office4 (Suzuki <office4@office.example.com>), office5 (Itoh <office5@office.example.com>) | a01.doc |
| sch-2 | RELEASE DATE CONSIDERATION | CONFER-ENCE | office1 | 2018-11-12 15:00-16:00 | office1 (Mary <office1@office.example.com>), office2 (Sato <office2@office.example.com>), office3 (Saito <office3@office.example.com>) | |

FIG. 28

USER INFORMATION LIST

| USER ID | NAME | MAIL ADDRESS | EXTERNAL SERVICE SETTING ID | IDENTIFICATION INFORMATION |
|---|---|---|---|---|
| user001 | Mary Smith | mary@intra.example.com | connect1a | ICCARD-123 |
| user002 | Sato Ayumu | sato@intra.example.com | connect2a | ICCARD-248 |
| user003 | Saito Ichiro | saito@intra.example.com | connect3a | ICCARD-255 |
| ... | ... | ... | ... | ... |

FIG. 29

EXTERNAL SERVICE SETTING INFORMATION

| EXTERNAL SERVICE SETTING ID | USER ID | ADDRESS INFORMATION | USER ID FOR EXTERNAL SERVICE | AUTHENTICATION TOKEN FOR EXTERNAL SERVICE |
|---|---|---|---|---|
| connect1a | user001 | office.example.com | office1 | eyJhbGc11... |
| connect2a | user002 | office.example.com | office2 | eyJhbGc12... |
| connect3a | user003 | office.example.com | office3 | eyJhbGc13... |
| ... | ... | ... | ... | ... |

FIG. 30

ATTENDEE MANAGEMENT INFORMATION LIST
(IN CASE WHERE MARY, SATO, AND SAITO ARE PRESENT IN CONFERENCE ROOM)

| USER ID | ORGANIZER |
|---|---|
| user001 | Yes |
| user002 | No |
| user003 | No |

FIG. 35

SCHEDULE INFORMATION FOR SCHEDULE SERVICE IN EXTERNAL
SERVICE GROUP SYSTEM A (AFTER CONFERENCE, ABSTRACT)

| SCHEDULE ID | SCHEDULE NAME | OWNER USER | ATTACHED FILE |
|---|---|---|---|
| sch-1 | DEMONSTRA-TION DOCUMENT CREATION | office1 | a01.doc |
| sch-2 | RELEASE DATE CONSIDERATION | office1 | RELEASE DATE CONSIDERATION_20181112.pdf |

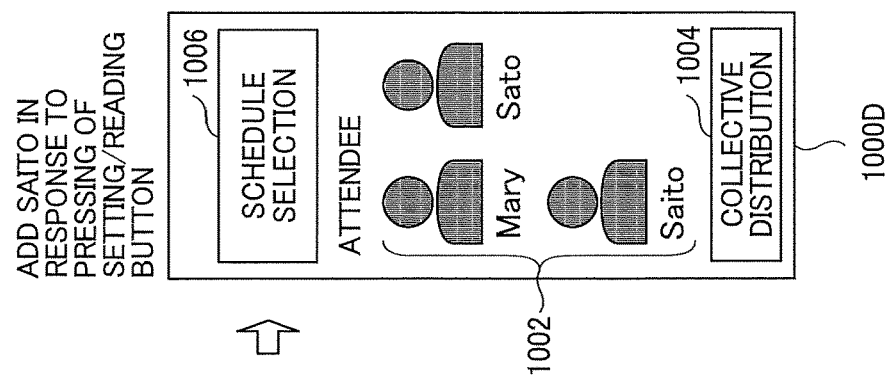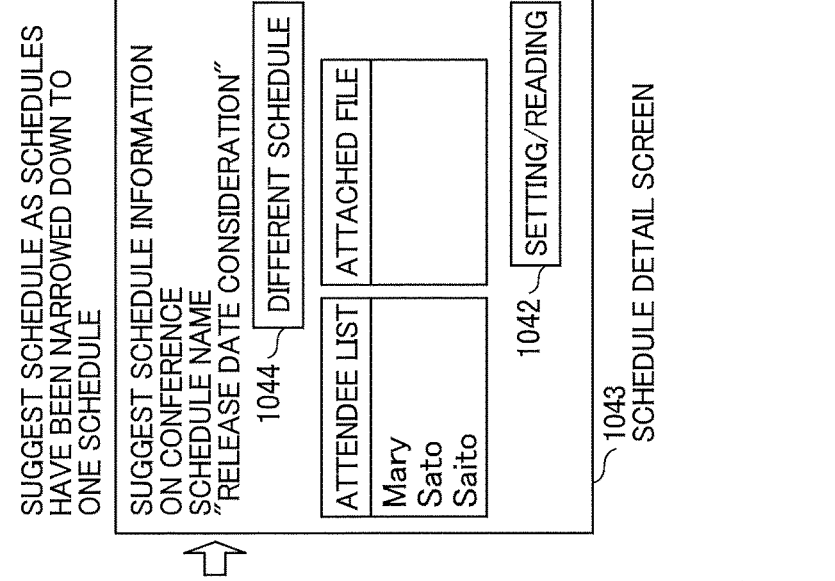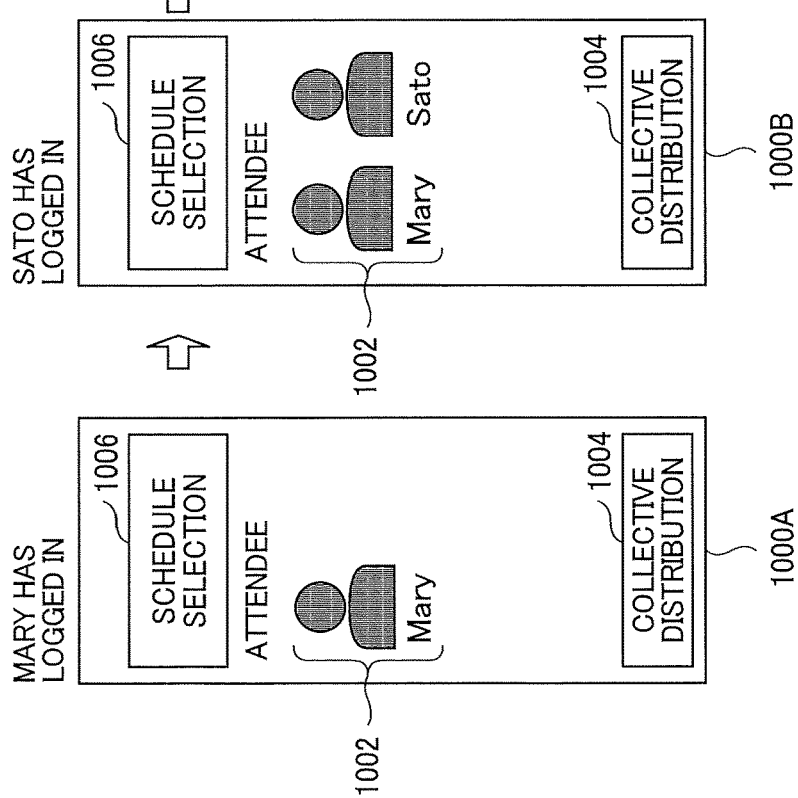

INFORMATION PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-085983, filed on Apr. 26, 2019, in the Japan Patent Office, the entire disclosure of which is hereby incorporated by reference herein.

BACKGROUND

Technical Field

The present invention relates to an information processing apparatus, an information processing system, an information processing method, and a recording medium.

Description of the Related Art

In the background teleconference systems, a plurality of remotely-located sites is connected via a network to cooperate with each other. For example, such teleconference system generates a graphical user interface (GUI) screen of each site, which is having a conference or a teleconference.

SUMMARY

Example embodiments include an information processing apparatus, an information processing system, and an information processing method, each of which: in response to detection of information identifying a user, acquires schedule information on the user from an external service, using external service setting information associated with the information identifying the user; when the user is to set a schedule for using the information processing apparatus, suggests the user with a schedule for using the information processing apparatus based on a current time, to cause the user to set the schedule for using the information processing apparatus; obtains information on an expected attendee registered for the schedule for using the information processing apparatus set by the user, based on the schedule information on the user; and transmits image data of an image being displayed on a display to the expected attendee.

BRIEF DESCRIPTION OF THE SEVERAL VIEWS OF THE DRAWINGS

A more complete appreciation of the disclosure and many of the attendant advantages and features thereof may be readily obtained and understood from the following detailed description referring to the accompanying drawings, wherein:

FIG. 5 is a table illustrating an example of account information according to the first embodiment;

FIG. 6 is a table illustrating an example of schedule information according to the first embodiment;

FIG. 7 is a table illustrating an example of a user information list according to the first embodiment;

FIG. 8 is a table illustrating an example of external service setting information according to the first embodiment;

FIG. 9 is a table illustrating an example of an attendee management information list according to the first embodiment;

FIG. 14 is a flowchart illustrating an example of the process to authenticate and set an organizer according to the first embodiment;

FIG. 15 is a flowchart illustrating an example of the process to acquire and suggest a schedule according to the first embodiment;

FIG. 20 is a table illustrating an example of the attendee management information list according to the first embodiment;

FIG. 21 is a flowchart illustrating an example of a collective distribution process according to the first embodiment;

FIG. 26 is a table illustrating an example of account information according to the second embodiment;

FIG. 27 is a table illustrating an example of schedule information according to the second embodiment;

FIG. 28 is a table illustrating an example of a user information list according to the second embodiment;

FIG. 29 is a table illustrating an example of external service setting information according to the second embodiment;

FIG. 30 is a table illustrating an example of an attendee management information list according to the second embodiment;

FIG. 35 is a table illustrating an example of schedule information in which the image data on content displayed by the electronic whiteboard is stored as an attached file according to the second embodiment;

FIGS. 37A to 37D are schematic views illustrating examples of an UI displayed by the electronic whiteboard according to the third embodiment.

Figure 1:
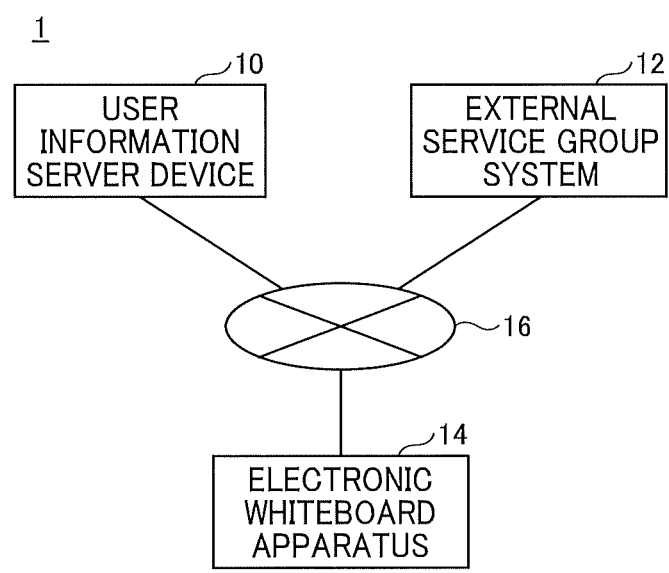
FIG. 1 is a schematic view illustrating an example of an information processing system according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described below. In the embodiments, for example, an electronic whiteboard (which may be referred to as the electronic whiteboard apparatus) used in a conference is described. However, the embodiments are applicable to various situations in which a plurality of users looks at the screen of an electronic whiteboard during a seminar or a lecture as well as a conference. The embodiments are also applicable to a situation where a plurality of users looks at two or more screens of electronic whiteboards during a teleconference, or the like, in which the electronic whiteboards perform communications with each other to share the screen and sounds.

Due to the recent spread of cloud computing, users are able to use external services such as schedule services or mail services. However, it has been impossible to use the information stored in an external service available to the user during the conference using an electronic whiteboard. In the following, a user who is an attendee of the conference using an electronic whiteboard (interactive whiteboard (IWB)) can use the information stored in an external service available to the user for the conference using the electronic whiteboard.

First Embodiment

System Configuration

FIG. 1 is a schematic view illustrating an example of an information processing system according to a first embodiment of the present invention. An information processing system 1 illustrated in FIG. 1 includes a user information server device 10, one or more external service group systems 12, and an electronic whiteboard 14. The user information server device 10, the external service group system 12, and the electronic whiteboard 14 are communicatively connected to one another via a network 16 such as the Internet or a local area network (LAN). The user information server device 10 and the electronic whiteboard 14 constitute an electronic whiteboard system. The user information server device 10 and the electronic whiteboard 14 operate in cooperation with the external service group system 12, which is outside the electronic whiteboard system, to provide a function regarding the electronic whiteboard 14. There may be the plurality of electronic whiteboards 14.

The external service group provided by the external service group system 12 includes an integrated service such as Office 365 (registered trademark) including a user service, a storage service, a mail service, a schedule service (calendar service), etc. The external service group is provided in such a way that services such as the user service, the storage service, the mail service, and the schedule service may be used with the same user account. The external service group provided by the external service group system 12 includes what is called groupware. Each service belonging to the same external service group may be used with the same authentication information (the combination of an ID and a password, an access token, etc.). Such external service group may be varied for each user and may be one or more in number. The external service group system 12 is implemented by using one or more computers.

The user information server device 10 stores, for example, a user information list and external service setting information as described later. The user information server device 10 is used by at least one of the external service group system 12 and the electronic whiteboard 14. The user information server device 10 may be shared by the plurality of electronic whiteboards 14 and do not need to be in the same network segment. The user information server device 10 may be built in the electronic whiteboard 14. The user information server device 10 is implemented by using one or more computers.

The electronic whiteboard 14 is used in a conference participated by a plurality of users. The electronic whiteboard 14 displays an image drawn with, for example, an electronic pen or the user's hand. The electronic whiteboard 14 may also display the image of an electronic file read from a Universal Serial Bus (USB) memory, a personal computer (PC) coupled via a cable, the external service group system 12, etc.

The electronic whiteboard 14 has the function to collectively distribute the image data on the image displayed by using a writing display function to the attendees of the conference. The distribution destination to which the electronic whiteboard 14 distributes the image data includes the external service group system 12 for which the use settings are specified for each user as described later. The electronic whiteboard 14 is an example. The electronic whiteboard 14 may be any device, such as a teleconference system, a display, or a projector, as long as the device has the function to store and distribute (transmit) the displayed data.

The configuration of the information processing system 1 illustrated in FIG. 1 is an example. For example, the electronic whiteboard 14 may have at least a part of the functions of the user information server device 10 and the external service group system 12. The information processing system 1 may have a configuration such that at least a part of the functions of the user information server device 10, the external service group system 12, and the electronic whiteboard 14 is implemented by using an information processing device other than the user information server device 10, the external service group system 12, and the electronic whiteboard 14.

Hardware Configuration

Computer

Figure 2:
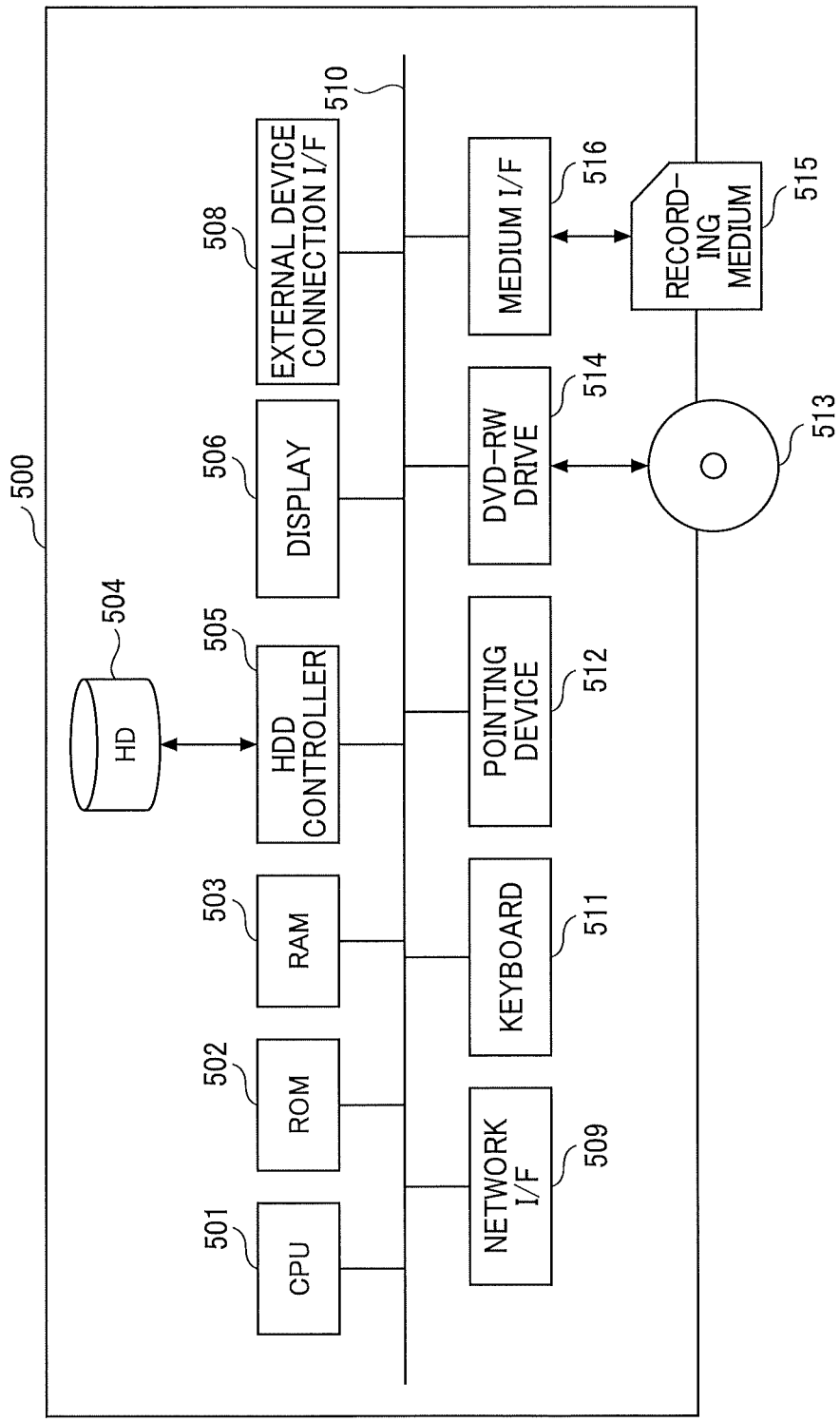
FIG. 2 is a block diagram illustrating an example of the hardware configuration of a computer according to the first embodiment.

The user information server device 10 and the external service group system 12 illustrated in FIG. 1 are implemented by using, for example, a computer 500 having the hardware configuration illustrated in FIG. 2. FIG. 2 is a block diagram illustrating an example of the hardware configuration of the computer 500 according to the present embodiment.

As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls the overall operation of the computer 500 in accordance with a program. The ROM 502 stores a program, such as an initial program loader (IPL), used for driving the CPU 501. The RAM 503 is used as a work area for the CPU 501. The HD 504 stores various types of data such as programs. The HDD controller 505 controls reading or writing of various types of data from or to the HD 504 under the control of the CPU 501.

The display 506 presents various types of information such as a cursor, menu, window, character, or image. The external device connection I/F 508 includes an interface to connect various external devices. In this case, examples of the external device include a USB memory or a printer. The network I/F 509 includes an interface to perform data communications using a communication network. The data bus 510 is, for example, an address bus or a data bus to electrically connect each component such as the CPU 501.

The keyboard 511 includes one type of input unit including a plurality of keys to input characters, numerical values, various instructions, etc. The pointing device 512 includes one type of input unit to, for example, select or execute various instructions, select the processing target, or move the cursor. The DVD-RW drive 514 controls reading or writing of various types of data from or to a DVD-RW 513 that is an example of a removable recording medium. For example, a DVD-R may be used as well as a DVD-RW. The medium I/F 516 controls reading or writing (storing) of data from or to a recording medium 515 such as a flash memory.

Electronic Whiteboard

Figure 3:
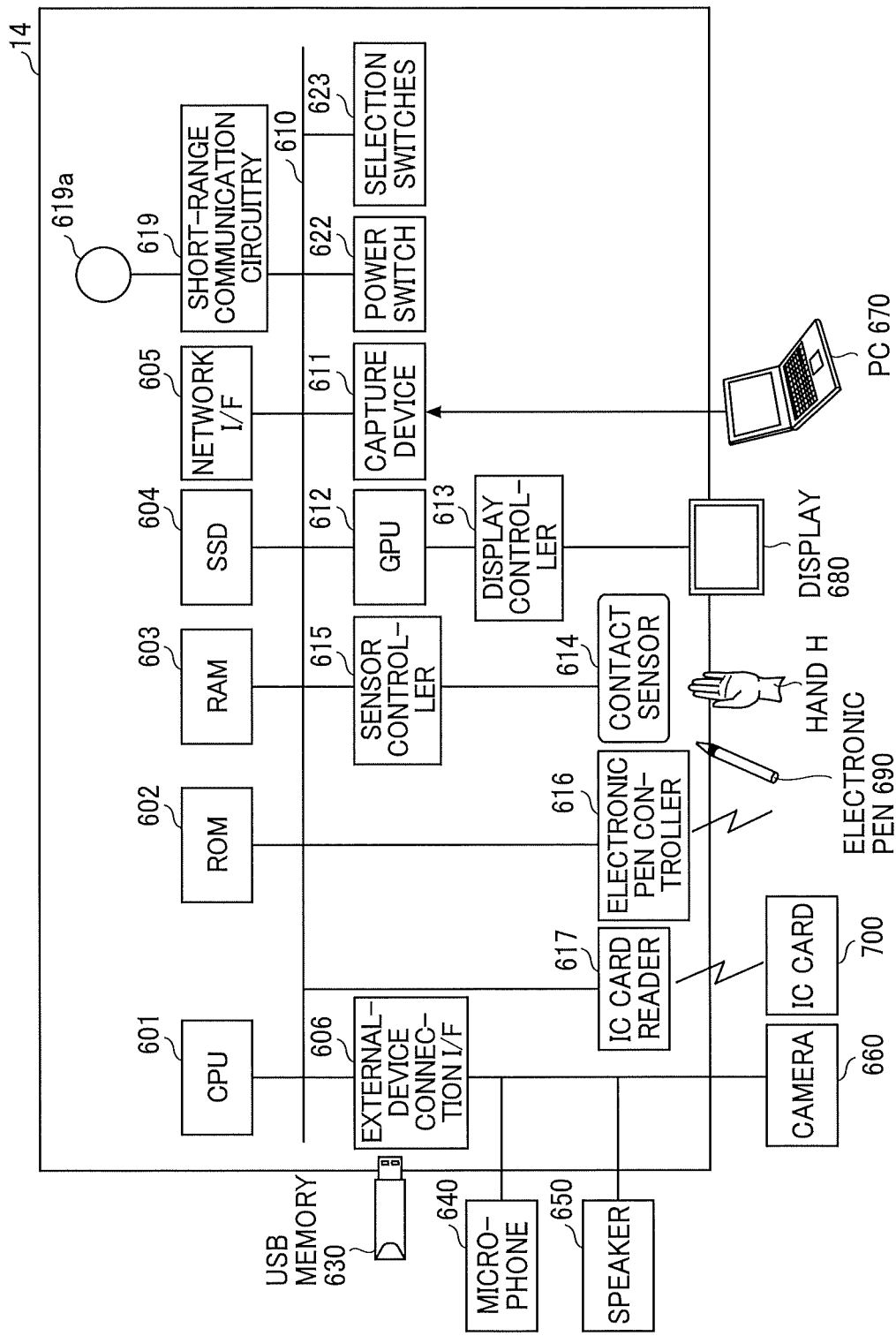
FIG. 3 is a block diagram illustrating an example of the hardware configuration of an electronic whiteboard according to the first embodiment.

FIG. 3 is a block diagram illustrating an example of the hardware configuration of the electronic whiteboard 14 according to the present embodiment. As illustrated in FIG. 3, the electronic whiteboard 14 includes a CPU 601, a ROM 602, a RAM 603, a solid state drive (SSD) 604, a network I/F 605, and an external device connection I/F 606.

The CPU 601 controls the overall operation of the electronic whiteboard 14 in accordance with a program. The ROM 602 stores a program, such as IPL, used for driving the CPU 601. The RAM 603 is used as a work area for the CPU 601. The SSD 604 stores various types of data such as a program for the electronic whiteboard 14.

The network I/F 605 controls the communication with the network 16. The external device connection I/F 606 includes an interface to connect various external devices. In this case, examples of the external device include a USB memory 630 and externally coupled devices (a microphone 640, a speaker 650, and a camera 660).

The electronic whiteboard 14 further includes a capture device 611, a graphics processing unit (GPU) 612, a display controller 613, a contact sensor 614, a sensor controller 615, an electronic pen controller 616, an integrated circuit (IC) card reader 617, a short-range communication circuitry 619, an antenna 619a for the short-range communication circuitry 619, a power switch 622, and selection switches 623.

The capture device 611 causes the display of an externally coupled PC 670 to present the video information as a still image or a moving image. The GPU 612 includes a semiconductor chip dedicated for graphics. The display controller 613 controls and manages the screen display so as to output an image from the GPU 612 to a display 680, etc.

The contact sensor 614 detects the contact on the display 680 with an electronic pen 690, a user's hand H, etc. The sensor controller 615 controls the processing of the contact sensor 614. The contact sensor 614 inputs and detects coordinates by using an infrared blocking method. In the method for inputting and detecting coordinates, two light emitting and receiving devices are provided at both upper ends of the display 680 to emit a plurality of infrared rays parallel with the display 680, and light receiving elements receive infrared rays that are reflected by a reflection member provided in the circumference of the display 680 and returned on the same optical path as that of the emitted infrared rays.

The contact sensor 614 outputs, to the sensor controller 615, the IDs of the infrared rays emitted by the two light emitting and receiving devices and blocked by the object. The sensor controller 615 identifies the coordinate position that is the contact position of the object. The electronic pen controller 616 communicates with the electronic pen 690 to determine whether there is a touch on the display 680 with the pen tip or the opposite end from the pen tip.

The IC card reader 617 reads the identification information unique to an IC card 700 from a radio-frequency (RF) tag embedded in the IC card 700 through a wireless communication. The IC card reader 617 may be integrated in the electronic whiteboard 14 or may be externally coupled to the electronic whiteboard 14. The IC card 700 may be integrated in a smart device such as a smartphone. The electronic whiteboard 14 may use a device other than the IC card reader 617 as long as the electronic whiteboard 14 may acquire the identification information with which a user is identifiable. The electronic whiteboard 14 may use, for example, a biometric authentication device (fingerprint, palm print, iris, face, etc.) or a bar code reader.

The short-range communication circuitry 619 includes a communication circuitry for Near Field Communication (NFC), Bluetooth (registered trademark), etc. The power switch 622 includes a switch for turning on/off the power of the electronic whiteboard 14. The selection switches 623 include, for example, a group of switches that adjust the brightness, the color, and the like, of the display 680.

The electronic whiteboard 14 includes a bus line 610. The bus line 610 includes, for example, an address bus or a data bus to electrically connect each component such as the CPU 601 illustrated in FIG. 3.

The contact sensor 614 may use, instead of the infrared blocking method, various detection devices such as a capacitive touch panel that detects a change in the capacitance to identify the contact position, a resistive touch panel that identifies the contact position in accordance with a change in the voltage of two opposing resistive films, or an electromagnetic induction touch panel that detects the electromagnetic induction caused due to the contact between the object and a display unit to identify the contact position. The electronic pen controller 616 may determine whether there is a touch with the portion of the electronic pen 690 grasped by the user or other portions of the electronic pen 690 as well as the pen tip of the electronic pen 690 and the opposite end from the pen tip.

Functional Configuration

Figure 4:
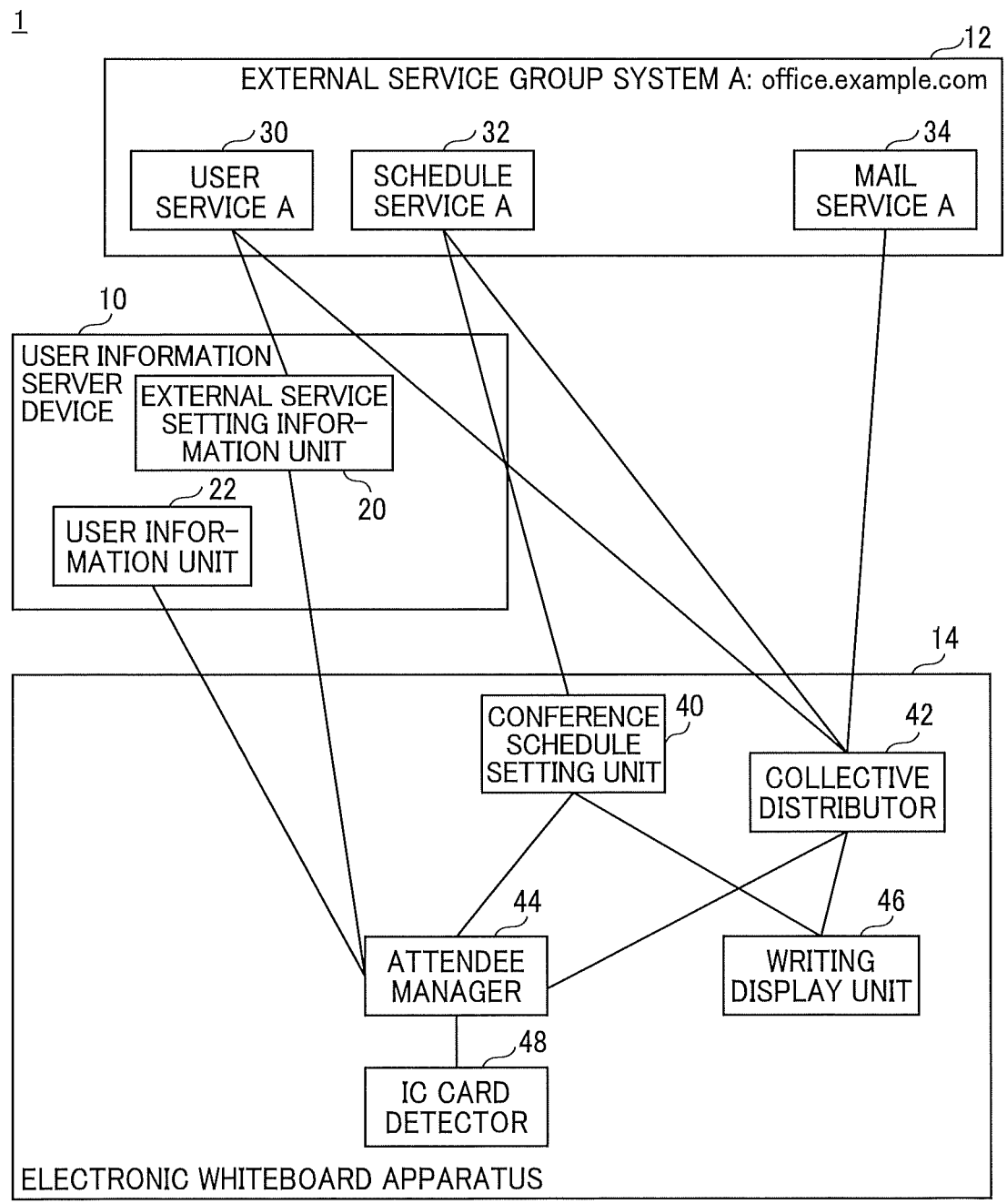
FIG. 4 is a diagram illustrating an example of the functional configuration of the information processing system according to the first embodiment.

The information processing system 1 according to the first embodiment is implemented by using, for example, the functional configuration illustrated in FIG. 4. FIG. 4 is a diagram illustrating an example of the functional configuration of the information processing system 1 according to the first embodiment. Some components are omitted as appropriate from the functional configuration illustrated in FIG. 4 for the description in the present embodiment.

The information processing system 1 illustrated in FIG. 4 includes the user information server device 10, the external service group system 12, and the electronic whiteboard 14. FIG. 4 illustrates an external service group system A "office.example.com" as an example of the external service group system 12.

The external service group system 12 includes a user service 30, a schedule service 32, and a mail service 34 as an external service group provided to a user. The user service 30 of the external service group system 12 stores for example the account information illustrated in FIG. 5. FIG. 5 is a table illustrating an example of the account information. As illustrated in FIG. 5, the user service 30 of the external service group system 12 stores, as the account information, a user ID, a name, and a mail address.

The schedule service 32 stores for example the schedule information illustrated in FIG. 6. FIG. 6 is a table illustrating an example of the schedule information. The schedule service 32 manages the user's scheduled actions and scheduled conferences based on the schedule information illustrated in FIG. 6.

As illustrated in FIG. 6, the schedule service 32 stores, as the schedule information, a schedule ID, a schedule name, a schedule type, an owner user, a start time and a period, an expected attendee, and an attached file. The schedule ID is an example of the identification information on a schedule. The schedule name is the name of a schedule. The schedule type is an example of the information for distinguishing between the user's scheduled action and the user's scheduled conference. The owner user is an example of the information for identifying the user who owns the schedule information on the corresponding schedule.

The start time and the period are examples of the information indicating the start time and date of a schedule and the period from the start to the end of the schedule and representing the expected start time and the expected end time. The expected attendee is an example of the information indicating a user who is expected to attend (participate in) a scheduled event, that is to say, the expected attendee refers to an example of an expected participant. The attached file is an example of the information indicating a file attached to the schedule (associated with the schedule).

The mail service 34 manages the mail address of each user in the external service group system 12 and provides a user with the mail function. The mail service 34 stores an electronic mail whose destination is the mail address of a user in the external service group system 12.

The user information server device 10 includes an external service setting information unit 20 and a user information unit 22. The user information unit 22 stores, for example, a user information list illustrated in FIG. 7. FIG. 7 is a table illustrating an example of the user information list. As illustrated in FIG. 7, the user information list stores a user ID, a name, a mail address, an external service setting ID, and identification information.

The mail address illustrated in FIG. 7 is different from the mail address illustrated in FIG. 5 and is a mail address used in, for example, an intranet. The external service setting ID is the information for identifying the external service setting information described later. The identification information is, for example, the identification information unique to the IC card 700. According to the user information list illustrated in FIG. 7, the identification information read from the IC card 700 of the user makes it possible to identify the user ID and the external service setting information on the user.

The external service setting information unit 20 stores, for example, the external service setting information illustrated in FIG. 8. FIG. 8 is a table illustrating an example of the external service setting information. The external service setting information illustrated in FIG. 8 is the setting information that is different for each user to use the external service group system 12. The external service setting information stores an external service setting ID, a user ID, address information, a user ID for an external service, and an authentication token for an external service.

The address information and the user ID for the external service are examples of the connection information for the external service group system 12. The authentication token for the external service is an example of the authentication information for the external service group system 12.

The electronic whiteboard 14 includes a conference schedule setting unit 40, a collective distributor 42, an attendee manager 44, a writing display unit 46, and an IC card detector 48. The IC card detector 48 reads the identification information from the IC card 700 of the detected user. The attendee manager 44 manages an attendee of the conference by using, for example, the attendee management information list illustrated in FIG. 9. The IC card detector 48 is an example of a user information detector that detects the information used to identify a user. The IC card detector 48 may detect the unique user information (e.g., physical information such as face or fingerprint, a user ID, or a password) as well as the IC card and use the unique user information to identify the user.

FIG. 9 is a table illustrating an example of the attendee management information list. The attendee management information list stores the user ID of a user who is recognized as an attendee of the conference using the electronic whiteboard 14. For example, the attendee manager 44 uses the identification information read by the IC card detector 48 to identify the user information from the user information list illustrated in FIG. 7 and stores the user ID of the identified user information as the user ID of the attendee in the attendee management information list.

The writing display unit 46 accepts the user's writing on the electronic whiteboard 14 and displays the content of the writing. The attendee manager 44 acquires the user information list illustrated in FIG. 7 and the external service setting information illustrated in FIG. 8 from the user information server device 10 and provides the user information list and the external service setting information to the collective distributor 42 so as to collectively distribute the image data on the content displayed by the electronic whiteboard 14 to the attendees of the conference.

The conference schedule setting unit 40 includes a user interface to set a scheduled conference. Therefore, the conference schedule setting unit 40 communicates with the schedule service 32 to acquire the schedule information illustrated in FIG. 6, displays the user's scheduled conference, and prompts the user to select a scheduled conference so that the user may set the scheduled conference. Furthermore, the conference schedule setting unit 40 suggests the user a scheduled conference that is selected from a plurality of user's scheduled conferences in the schedule information as described later.

The collective distributor 42 collectively distributes the image data on the content displayed by the electronic whiteboard 14 to the attendees of the conference in accordance with the schedule information in FIG. 6, the user information list in FIG. 7, and the external service setting information in FIG. 8.

For example, the collective distributor 42 attaches the image data on the content displayed by the electronic whiteboard 14 to the electronic mail addressed to the mail address for the mail service 34, which may be used with the user account of the attendee, and transmits the image data.

The configuration illustrated in FIG. 4 is an example, and other configurations may be applied. For example, each unit of the electronic whiteboard 14 may be configured by using two devices, or each unit other than the IC card detector 48 and the writing display unit 46 of the electronic whiteboard 14 may be implemented by using a server device. Alternatively, the user information server device 10 may include each unit other than the IC card detector 48 and the writing display unit 46 of the electronic whiteboard 14 without changing the device configuration. Alternatively, different devices may include the user information unit 22 and the external service setting information unit 20, respectively, of the user information server device 10.

Overview of Functions of Electronic Whiteboard

Figure 10:
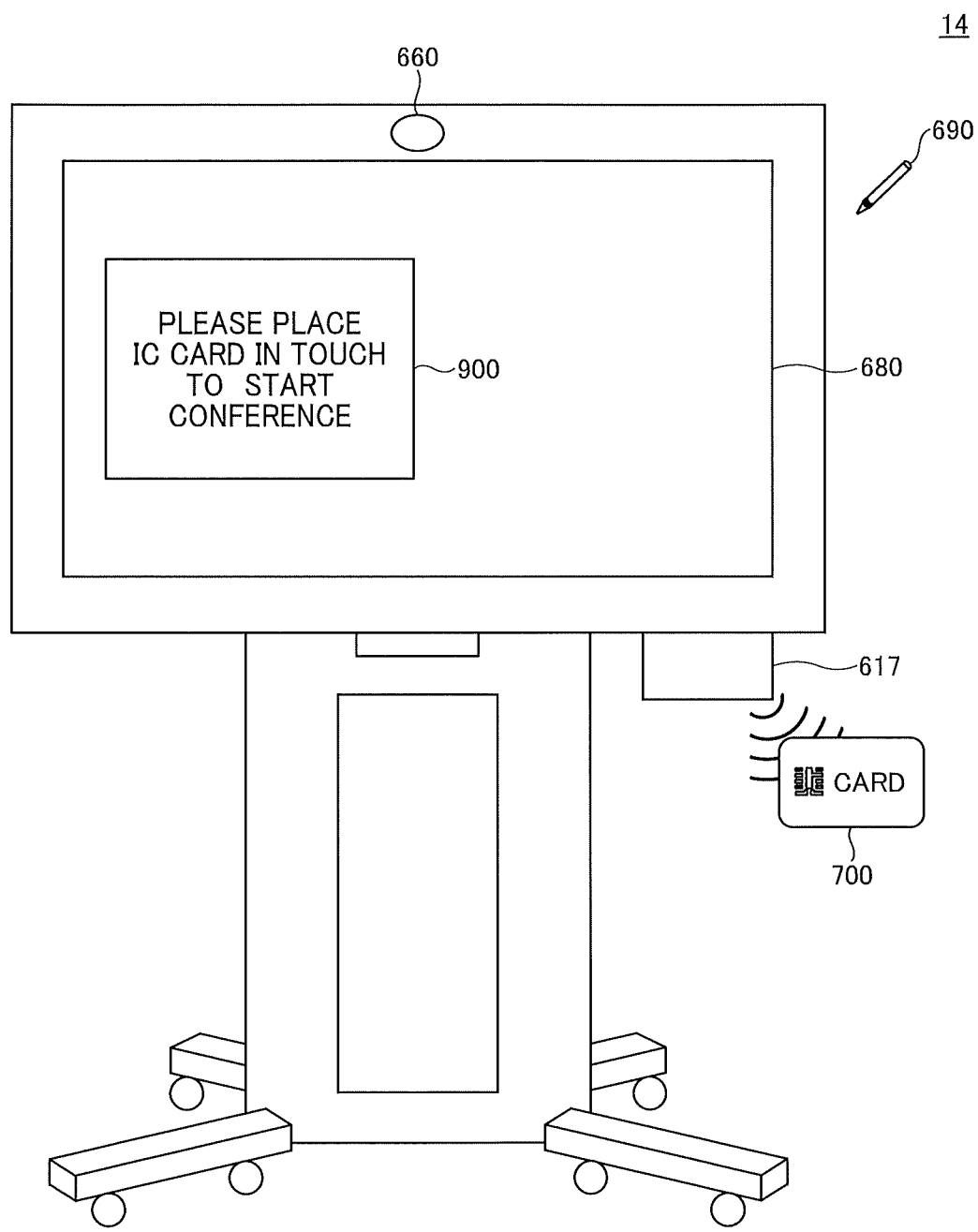
FIG. 10 is an external view of the electronic whiteboard according to an embodiment of the present invention.

FIG. 10 is an external view of the electronic whiteboard 14 according to an embodiment of the present invention. As illustrated in FIG. 10, the electronic whiteboard 14 includes the display 680, the camera 660, and the IC card reader 617. The display 680 presents a control panel 900, with control panels being described later. The electronic whiteboard 14 according to an embodiment has at least the following first to fifth functions.

First Function: Electronic Whiteboard Function

The electronic whiteboard 14 enables writing on the electronic whiteboard with the electronic pen 690, the finger, etc. The electronic whiteboard 14 may e-mail the image data on the image written on the electronic whiteboard and may store the image data in the storage provided by the storage service of the external service group system 12. The electronic whiteboard 14 may also display a file such as a conference material or edit a file.

Second Function: Authentication Function

The electronic whiteboard 14 may use, for example, the IC card reader 617, the camera 660, or a biometric authentication device to acquire authentication information, and the like, and perform the user authentication based on the authentication information. The electronic whiteboard 14 may perform the user authentication on its own. Alternatively, the electronic whiteboard 14 may cause an external device to perform the user authentication. The IC card reader 617 may acquire, from the IC card 700, the authentication information such as the identification information unique to the IC card 700 and refers to the user information list illustrated in FIG. 7 to determine whether the authentication information is matched so as to perform the user authentication. Alternatively, the feature value is extracted from the face image captured by the camera 660, and it is determined whether the feature value matches a feature value registered in the user information list, whereby the user authentication may be performed.

Third Function: External Service Linkage Function

The electronic whiteboard 14 may cooperate with the external service group system 12. For example, the electronic whiteboard 14 may use the external service setting information on the user who has been authenticated by the above-described authentication function to acquire the schedule information on the user from the external service and e-mail the information such as the writing on the whiteboard during a conference or a file to the mail address of the expected attendee of the scheduled conference. For example, the electronic whiteboard 14 may access the storage provided by the storage service of the external service group system 12 for the authenticated user to acquire a file, share a file with other devices, or transfer a file to other devices.

Fourth Function: Remote Sharing Function

The electronic whiteboard 14 may share the screen displayed by the electronic whiteboard 14, cooperatively edit the screen (remote execution of an electronic whiteboard function), share an image or a video of, for example, an attendee of the conference captured by the camera 660, or share the sounds obtained through the microphone 640 with a plurality of information processing apparatuses (other electronic whiteboards 14, PCs, etc.) provided at remote locations. Sharing the screen means that the information processing apparatuses provided at remote locations each display the same content and use the content for the discussion during the teleconference. Cooperatively editing the screen means that, for example, a plurality of information processing apparatuses writes on the same screen or edit a file.

Fifth Function: Other Functions

The electronic whiteboard 14 may include an application, such as a browser or a mail application, which is similar to the application operating on a general-use PC or smart device.

Each of the above-described functions is implemented by the cooperation of the hardware and the software of the electronic whiteboard 14. The software includes the cooperative operation of pieces of software of the electronic whiteboard 14 and an external device.

Information Used in Electronic Whiteboard

Figure 11:
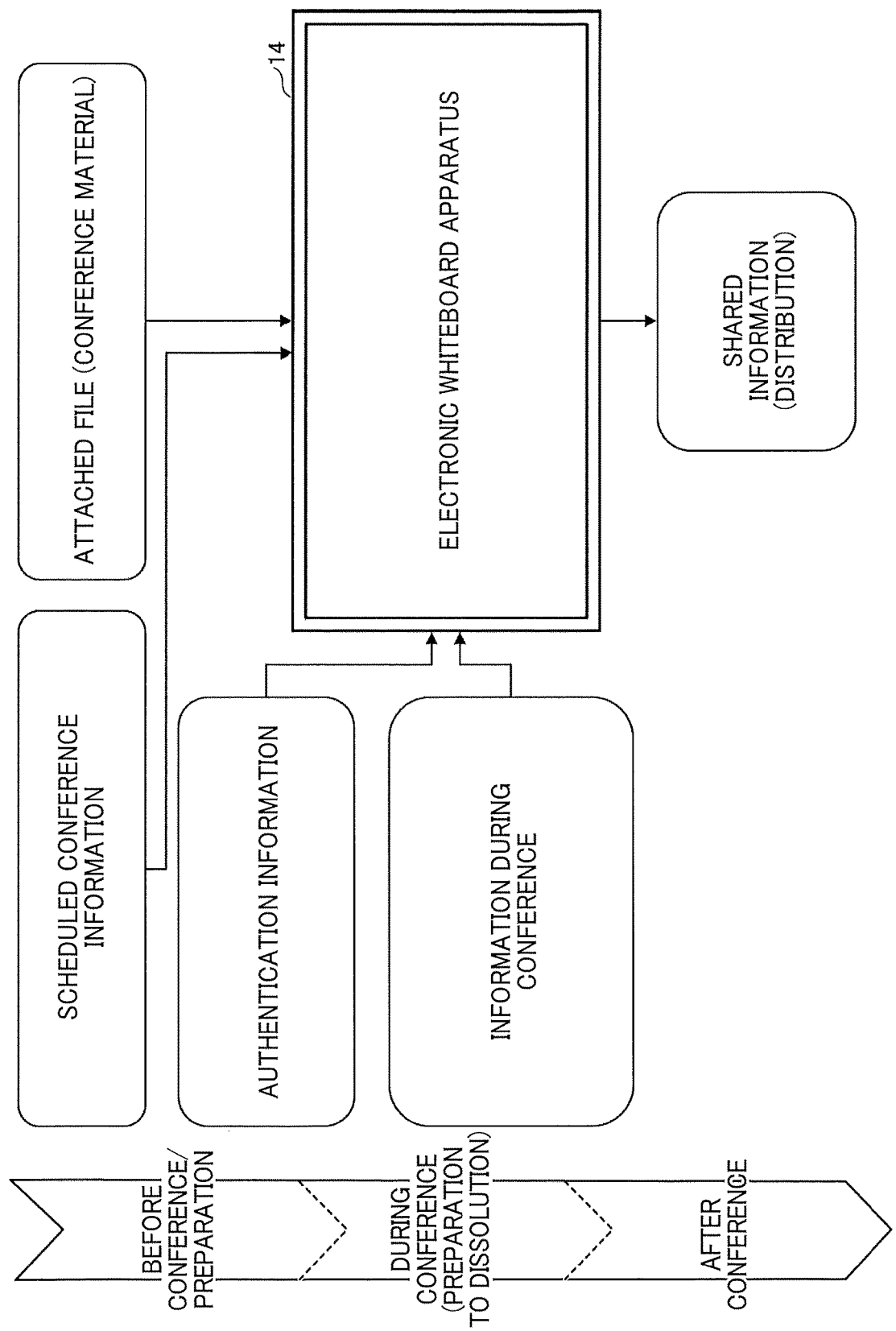
FIG. 11 is a conceptual diagram illustrating the information used in the electronic whiteboard according to an embodiment of the present invention.

FIG. 11 is a conceptual diagram illustrating the information used in the electronic whiteboard 14 according to an embodiment of the present invention. The information used in the electronic whiteboard 14 according to the present embodiment is as follows.

Before Conference/Preparation Stage

As illustrated in FIG. 11, examples of the information that is prepared before or at the preparation stage of the conference by the electronic whiteboard 14 and is input to the electronic whiteboard 14 include the scheduled conference information and the attached file (conference material). The scheduled conference information includes the information on the scheduled conference that is previously registered. For example, the scheduled conference information includes the schedule name, the start time and the period, and the expected attendees.

During Conference

Examples of the information input to the electronic whiteboard 14 during the conference further include authentication information, which is an example of the attendee information, and information during the conference. Examples of the authentication information include the identification information on the IC card 700, the attendee's ID information that is manually input, the attendee's face image, the biological information, or the quick response (QR) code (registered trademark) image that is a two-dimensional code of the attendee's user ID.

The information during the conference includes the information input to the electronic whiteboard 14 during the conference. Examples of the information during the conference include various types of conference information, a capture image of the screen with the writing on the whiteboard, a remotely shared screen, a file shared during the conference, conference minutes, note, or sound.

After Conference

For example, the information generated, updated, and stored by the electronic whiteboard 14 during the conference is used as described below. The electronic whiteboard 14 selects the mail address of an attendee as the transmission destination and transmits the information to be shared after the conference (e.g., the shared screen or the file of conference material) to the mail address so as to use the information generated, updated, and stored during the conference.

Processing

The information processing system 1 according to the first embodiment holds a conference using the electronic whiteboard 14 in for example the procedure described below. In the primary usage example described here, a conference is held by using the electronic whiteboard 14, and the image data on the content displayed by the electronic whiteboard 14 is collectively distributed to the attendees of the conference.

Figure 12:
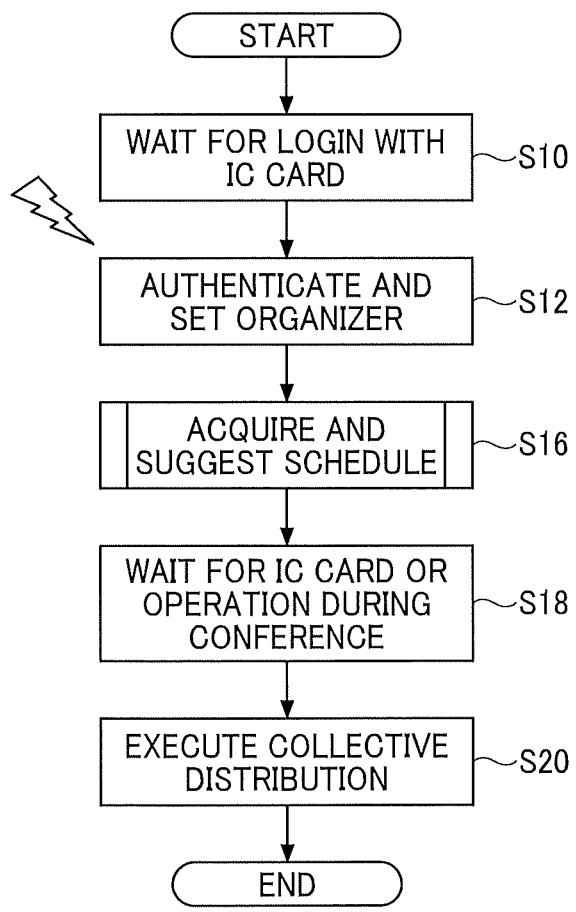
FIG. 12 is a flowchart illustrating an example of the flow of a conference using the electronic whiteboard according to the first embodiment.

FIG. 12 is a flowchart illustrating an example of the flow of a conference using the electronic whiteboard 14. In Step S10, the electronic whiteboard 14 is activated to wait for the login using, for example, the IC card 700. The organizer of the conference holds the IC card 700 of his/her own over the IC card detector 48.

When the IC card detector 48 detects the IC card 700, the electronic whiteboard 14 identifies the user information from the identification information read from the IC card 700 and authenticates and sets the user as the organizer in Step S12. As for the organizer of the conference, in response to the designation accepted from the user via the user interface and indicating any one of the users as the organizer, the designated user may be set as the organizer, or any one of the users may be set as the organizer based on the information included in the schedule information acquired from the schedule service 32. According to the present embodiment, however, the first user who has been authenticated during the conference is set as the organizer of the conference.

In Step S16, the electronic whiteboard 14 acquires the organizer's schedule information from the schedule service 32 and suggests the conference to be started among the scheduled conferences of the organizer included in the schedule information as described later. The organizer may set the suggested scheduled conference as the conference to be started.

The electronic whiteboard 14 manages the expected attendee of the scheduled conference, which is set as the conference to be started, as an attendee of the conference and adds the attendee to the attendee management information list. The electronic whiteboard 14 may make a suggestion as to whether the expected attendee of the scheduled conference, which is set as the conference to be started, is to be added as an attendee of the conference.

The electronic whiteboard 14 acquires the attached file for the scheduled conference, which is set as the conference to be started, as a conference material. The electronic whiteboard 14 may make a suggestion as to whether the attached file for the scheduled conference, which is set as the conference to be started, is to be acquired as a conference material. For example, when the organizer sets the suggested scheduled conference as the conference to be started, the electronic whiteboard 14 reads and displays the attached file in accordance with the set scheduled conference.

Figure 13:
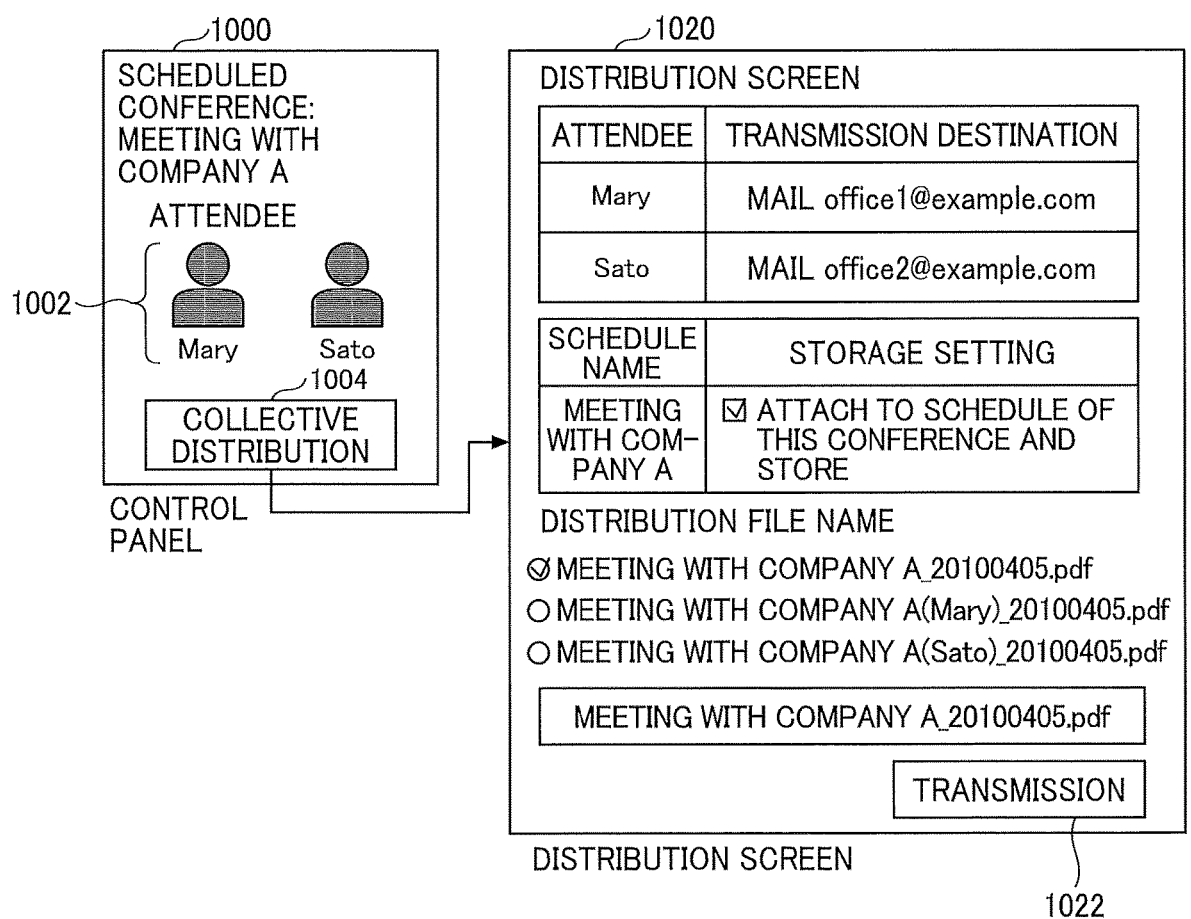
FIG. 13 is a schematic view illustrating an example of an UI displayed by the electronic whiteboard according to the first embodiment.

In Step S18, the electronic whiteboard 14 displays, for example, the control panel 1000 illustrated in FIG. 13 as a user interface (hereinafter referred to as UI). FIG. 13 is a schematic view illustrating an example of the UI displayed by the electronic whiteboard 14. The control panel 1000 illustrated in FIG. 13 displays an attendee list 1002 and a collective distribution button 1004. The user displayed in the attendee list 1002 is managed as an attendee of the conference, and the image data on the content displayed by the electronic whiteboard 14 is distributed to the user.

During the conference, the electronic whiteboard 14 accepts the user's operation, such as writing, on the electronic whiteboard 14 and updates the displayed content. When the IC card detector 48 detects the IC card 700, the attendee manager 44 identifies the user information from the identification information read from the IC card 700, manages the user as an attendee of the conference, and adds the attendee to the attendee list 1002.

When the pressing on the collective distribution button 1004 is detected in Step S20, the electronic whiteboard 14 displays a distribution screen 1020 illustrated in FIG. 13 and, in response to the pressing on a transmission button 1022, collectively distributes the image data on the content displayed by the electronic whiteboard 14 to the attendees of the conference. The distribution screen 1020 illustrated in FIG. 13 displays the attendees of the conference, the transmission destinations of the attendees, and a check box for selecting the set scheduled conference for the transmission destination. The distribution screen 1020 illustrated in FIG. 13 also displays a field for selecting and inputting a distribution file name.

In Step S12 of FIG. 12, the organizer is authenticated and set in the procedure illustrated in for example FIG. 14. FIG. 14 is a flowchart illustrating an example of the process to authenticate and set the organizer. FIG. 14 illustrates the process after the IC card detector 48 of the electronic whiteboard 14 detects the IC card 700 and reads the identification information from the IC card 700.

In Step S30, the attendee manager 44 acquires the identification information that is read by the IC card detector 48 from the IC card 700. In Step S32, the attendee manager 44 refers to the user information list illustrated in FIG. 7 and identifies the user with the identification information acquired in Step S30 from the user information list illustrated in FIG. 7. In Step S34, the attendee manager 44 manages the identified user as the organizer and adds the user to the attendee list 1002.

For example, when the IC card detector 48 detects the IC card 700 of "Mary Smith" illustrated in the user information list of FIG. 7, the IC card detector 48 reads the identification information "ICCARD-123" from the IC card 700. In Step S30, the attendee manager 44 acquires the identification information "ICCARD-123" from the IC card detector 48. In Step S32, the attendee manager 44 makes an inquiry to the external service setting information unit 20 and the user information unit 22 of the user information server device 10 based on the acquired identification information "ICCARD-123".

The user information unit 22 executes search using the inquired identification information "ICCARD-123", identifies the user information with the user ID "user001", and returns the user information to the attendee manager 44 of the electronic whiteboard 14. The external service setting information unit 20 executes search using the identified user ID "user001", identifies the external service setting information "connect1a" illustrated in FIG. 8, and returns the external service setting information "connect1a" to the attendee manager 44 of the electronic whiteboard 14.

In Step S34, the attendee manager 44 may manage the user with the user ID "user001" as the organizer, add the user to the attendee list 1002, and manage the external service setting info Illation "connect1a" on the user with the user ID "user001". Thus, the conference organizer "Mary Smith" is registered in the attendee manager 44, and the attendee management information list illustrated in FIG. 9, the user information with the user ID "user001" illustrated in FIG. 7, and the external service setting information with the external service setting ID "connect1a" illustrated in FIG. 8 are acquired.

In Step S16 of FIG. 12, a schedule is acquired and suggested in the procedure illustrated in for example FIG. 15. FIG. 15 is a flowchart illustrating an example of the process to acquire and suggest a schedule.

In Step S40, the conference schedule setting unit 40 of the electronic whiteboard 14 acquires a scheduled conference included in the organizer's schedule information of the day from the schedule service 32 based on the user ID of the organizer acquired during the authentication. To acquire the organizer's scheduled conference of the day, the conference schedule setting unit 40 of the electronic whiteboard 14 acquires the external service setting information on the organizer from the user information server device 10 based on the user ID of the organizer acquired during the authentication and, based on the acquired external service setting information on the organizer, requests the scheduled conference information on the day of the user identified by the external service setting information from the schedule service 32 so as to acquire the scheduled conference information. It is also possible that, without acquiring the external service setting information, the conference schedule setting unit 40 of the electronic whiteboard 14 simply designates the user ID of the organizer and requests the user information server device 10 to acquire the scheduled conference information and, consequently, the user information server device 10 identifies the external service setting information based on the acquired user ID of the organizer, requests the scheduled conference information from the schedule service 32 based on the identified external service setting information, acquires the scheduled conference information, and returns the acquired scheduled conference information to the electronic whiteboard 14. That is, the electronic whiteboard 14 and the schedule service 32 do not directly communicate information, and the electronic whiteboard 14 may acquire scheduled conference information from the schedule service 32 via a different server.

In Step S42, the conference schedule setting unit 40 determines whether there is a scheduled conference acquired in Step S40. When it is determined that there is no scheduled conference (No in Step S42), the conference schedule setting unit 40 skips the operation in Step S44. When it is determined that there is a scheduled conference (Yes in Step S42), the conference schedule setting unit 40 performs a schedule suggestion process in Step S44 that is illustrated in for example FIG. 16.

Figure 16:
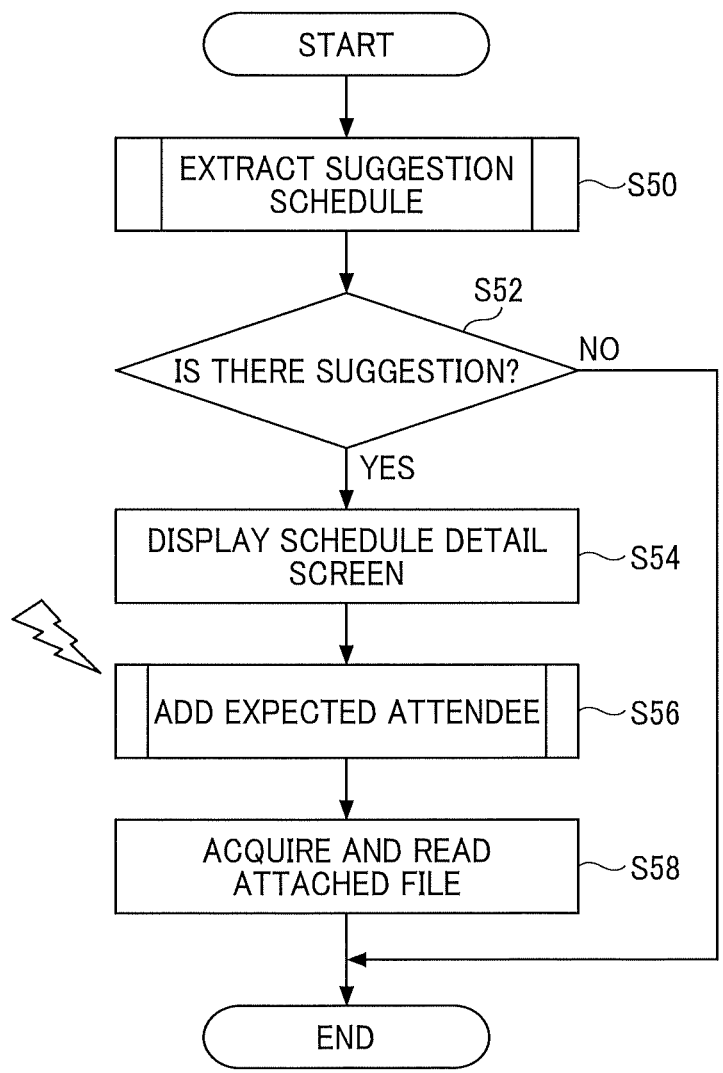
FIG. 16 is a flowchart illustrating an example of a schedule suggestion process according to the first embodiment.

FIG. 16 is a flowchart illustrating an example of the schedule suggestion process. In Step S50, the conference schedule setting unit 40 extracts a suggestion schedule for suggesting the conference to be started from the organizer's scheduled conferences of the day acquired in Step S40, as illustrated in FIG. 17.

Figure 17:
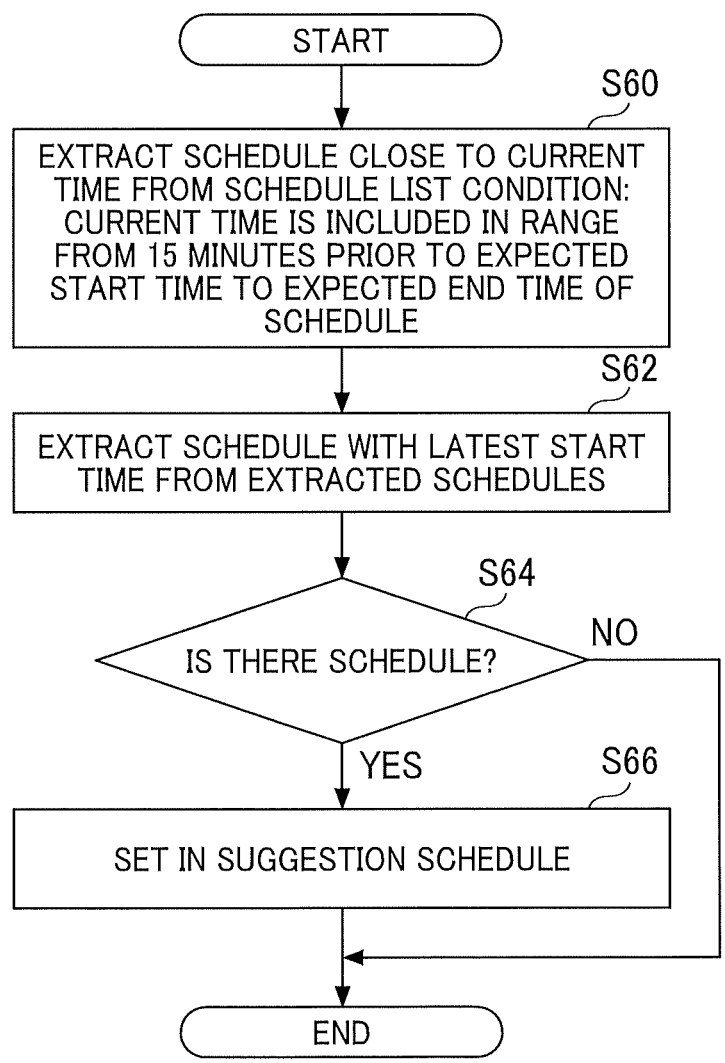
FIG. 17 is a flowchart illustrating an example of a suggestion schedule extraction process according to the first embodiment.

FIG. 17 is a flowchart illustrating an example of the suggestion schedule extraction process. In Step S60, the conference schedule setting unit 40 extracts the scheduled conference whose "start time and period" are close to the current time from the organizer's scheduled conferences of the day acquired in Step S40. For example, the conference schedule setting unit 40 extracts a scheduled conference, of which the range from 15 minutes prior to the expected start time to the expected end time includes the current time. As there may be a plurality of scheduled conferences that are extracted in Step S60, the conference schedule setting unit 40 extracts the scheduled conference with the latest expected start time from the extracted scheduled conferences in Step S62.

In Step S64, the conference schedule setting unit 40 determines whether there is a scheduled conference extracted in Step S62. When it is determined that there is a scheduled conference extracted in Step S62 (Yes in Step S62), the conference schedule setting unit 40 sets the scheduled conference in the suggestion schedule in Step S66. When it is determined that there is no scheduled conference extracted in Step S62 (No in Step S62), the conference schedule setting unit 40 skips the operation in Step S66.

Figure 18:
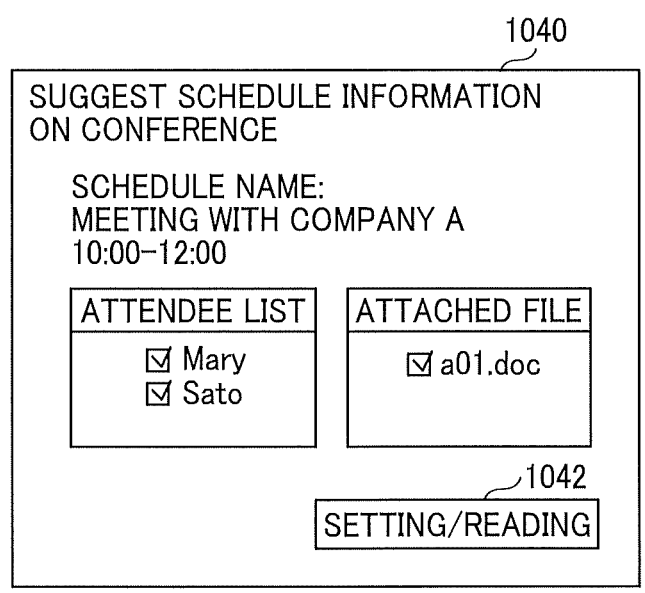
FIG. 18 is a schematic view illustrating an example of a schedule detail screen according to the first embodiment.

Referring back to Step S52 in FIG. 16, when it is determined that there is a suggestion schedule extracted in Step S50 (Yes in Step S52), the conference schedule setting unit 40 displays a schedule detail screen 1040 illustrated in FIG. 18 so as to suggest the scheduled conference in Step S54. FIG. 18 is a schematic view illustrating an example of the schedule detail screen 1040.

The schedule detail screen 1040 illustrated in FIG. 18 includes a screen generated based on the scheduled conference information acquired from the schedule service 32. On the schedule detail screen 1040, the administrator may check information such as the schedule name of a scheduled conference, the start time and the period, the expected attendees, or the attached file. The schedule detail screen 1040 illustrated in FIG. 18 includes check boxes for an expected attendee and an attached file so that the expected attendee and the attached file in the clicked check boxes are the targets to be processed when a setting/reading button 1042 is pressed.

When the setting/reading button 1042 is pressed, the conference schedule setting unit 40 adds the expected attendees of the suggested scheduled conference to the attendee management information list illustrated in FIG. 9 in Step S56. In Step S58, the conference schedule setting unit 40 acquires the suggested attached file for the scheduled conference from the schedule service 32, displays the attached file on the writing display unit 46, and notifies the collective distributor 42 of the file name (distribution file name) of the attached file.

Figure 19:
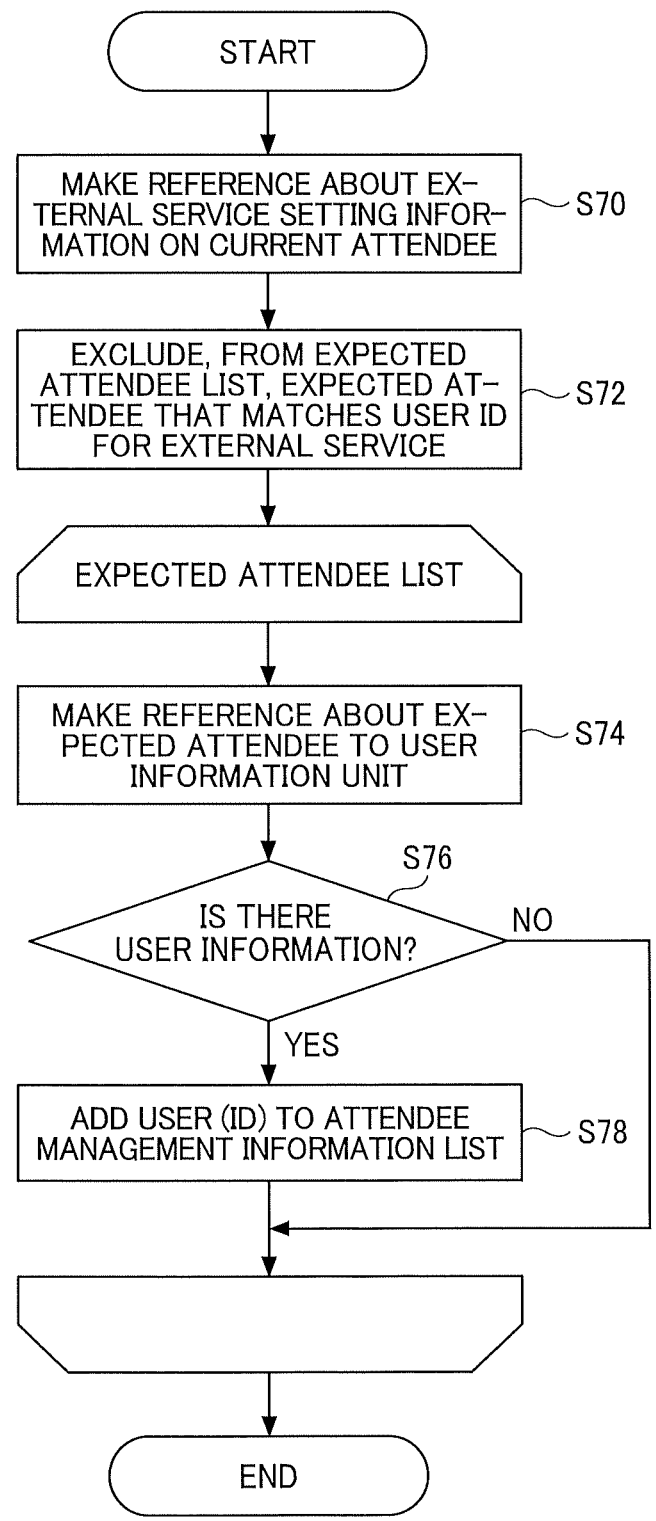
FIG. 19 is a flowchart illustrating an example of the process to add expected attendees of the suggested scheduled conference to the attendee management information list according to the first embodiment.

In Step S56 of FIG. 16, the conference schedule setting unit 40 notifies the attendee manager 44 of the expected attendees of the suggested scheduled conference so as to add the expected attendees as attendees of the conference to the attendee management information list illustrated in FIG. 9 in, for example, the procedure illustrated in FIG. 19. FIG. 19 is a flowchart illustrating an example of the process to add the expected attendees of the suggested scheduled conference to the attendee management information list.

In Step S70, the attendee manager 44 makes reference about the external service setting information on the current attendee (organizer) to the external service setting information unit 20. In Step S72, the attendee manager 44 excludes, from the expected attendees included in the organizer's schedule information, the expected attendee that matches the user ID of the organizer.

The process from Steps S74 to S78 is performed on all the expected attendees included in the expected attendee list from which the user ID of the organizer has been excluded in Step S72. In Step S74, the attendee manager 44 makes reference about the user information corresponding to the user ID of the expected attendee for the external service to the user information unit 22.

In Step S76, it is determined whether there is the user information corresponding to the user ID for the external service. When it is determined that there is the user information corresponding to the user ID for the external service (Yes in Step S76), the attendee manager 44 adds the user ID of the expected attendee to the attendee management information list illustrated in FIG. 9 in Step S78. When it is determined that there is no user information corresponding to the user ID for the external service (No in Step S76), the attendee manager 44 skips the operation in Step S78.

For example, in Step S40, the conference schedule setting unit 40 of the electronic whiteboard 14 uses the external service setting information "connect1a" of the organizer "Mary Smith" with the user ID "user001" returned from the user information server device 10 to acquire, from the schedule service 32, the scheduled conferences with the schedule IDs "sch-1" and "sch-2" included in the organizer's schedule information on the day. In Step S42, the conference schedule setting unit 40 determines whether there is a scheduled conference acquired in Step S40.

When it is determined that there are scheduled conferences with the schedule IDs "sch-1" and "sch-2" (Yes in Step S42), the conference schedule setting unit 40 performs a schedule suggestion process in Step S44 that is illustrated in for example FIG. 16. The conference schedule setting unit 40 performs the suggestion schedule extraction processes illustrated in FIG. 17.

For example, it is assumed that the user enters the conference room at 9:55 on Apr. 5, 2010 and starts up the electronic whiteboard 14. In Step S60, the conference schedule setting unit 40 extracts, from the scheduled conferences with the schedule IDs "sch-1" and "sch-2" that are the organizer's scheduled conferences on the day acquired in Step S40, the scheduled conference with the schedule ID "sch-1" whose start time and period are close to the current time "9:55 on Apr. 5, 2010".

Typically, conference rooms and conference spaces are often reserved or operated in units of 30 minutes, that is to say, each time reserved or operated for 30 minutes or 60 minutes, for instance. Therefore, under the scheduled conference extraction condition in Step S60, it is possible to handle the situation where the user enters the room a little earlier and starts to use the room or the user enters the room a little later and starts to use the room as described in the above example.

The threshold is set to 15 minutes, which is half of 30 minutes that is the time unit for a conference. For example, even when the user starts a huddle conference at 9:30 without setting a scheduled conference, the scheduled conference with the start time of 10:00 is not suggested by mistake. As for the start time of preparation, the user rarely starts the preparation earlier than 15 minutes prior to the expected start time, and therefore it can be said that the threshold is reasonable.

When multiple scheduled conferences are extracted in Step S60, the scheduled conference with the latest start time is extracted. For example, when there is a scheduled conference from 9:00 to 10:00 and if the conference ends early and the user starts to prepare for the next conference at 9:55, 9:55 is included in the range from the expected start time to the expected end time of the scheduled conference, i.e., from 9:00 to 10:00.

Therefore, there are the two appropriate scheduled conferences, i.e., the scheduled conference from 9:00 to 10:00 and the scheduled conference "sch-1" from 10:00 to 12:00. In this case, the scheduled conference with the latest start time is extracted, that is, the scheduled conference "sch-1" with the latest start time is extracted; thus, it is possible to suggest the scheduled conference that is to be prepared and started by the organizer. The extraction conditions may be changed by the setting of the organizer. During the processes in FIGS. 15 and 16, after the scheduled conference information of the day is acquired from the schedule service 32, a scheduled conference is extracted based on the current time. Alternatively, the scheduled conference information may be requested from the schedule service 32 with the specified time in addition to the specified date so that the scheduled conference is extracted. That is, a scheduled conference may be extracted based on the user authenticated by the electronic whiteboard 14 used for a conference and the current time as well as the time when the scheduled conference information is acquired.

When the setting/reading button 1042 of the schedule detail screen 1040 illustrated in FIG. 18 is pressed, the attendee manager 44 makes reference about the external service setting information "connect1a" of the current attendee (organizer) to the external service setting information unit 20 in Step S70.

In Step S72, the attendee manager 44 excludes "office1", which is the user ID of the organizer for the external service, from the expected attendees included in the schedule information on the organizer "user001".

Subsequently, in Step S74, the attendee manager 44 makes reference about the user information corresponding to the user ID "office2" of the remaining expected attendee for the external service to the user information server device 10.

In Step S76, the user information server device 10 determines whether there is the user ID "user002" corresponding to the user ID "office2" for the external service. When it is determined that there is the user ID "user002" corresponding to the user ID "office2" for the external service (Yes in Step S76), the user information server device 10 returns the user ID "user002" to the attendee manager 44 in Step S78. In Step S78, the attendee manager 44 adds the user ID "user002" to the attendee management information list illustrated in FIG. 9 to obtain the attendee management information list illustrated in FIG. 20. FIG. 20 is a table illustrating an example of the attendee management information list.

In the above-described procedure, according to the present embodiment, the organizer's schedule information registered in the schedule service 32 may be set and read as a scheduled conference for the electronic whiteboard 14, whereby it is possible to facilitate the participation of attendees without the IC card 700 in a conference and the addition of the attendees as the transmission destinations for collective distribution.

In Step S20 of FIG. 12, the image data on the content displayed by the electronic whiteboard 14 is collectively distributed to the attendees of the conference in the procedure illustrated in, for example, FIG. 21. FIG. 21 is a flowchart illustrating an example of the collective distribution process. When the pressing on the collective distribution button 1004 is detected, the collective distributor 42 performs the process from Steps S80 to S84 on all the attendees managed in the attendee management information list acquired from the attendee manager 44 so as to perform the transmission destination addition process in Step S82.

When the transmission destination addition process in Step S82 is completed for all the attendees, the collective distributor 42 displays the distribution screen 1020 in Step S86. When the transmission button 1022 is pressed, the collective distributor 42 performs, in Step S88, the full transmission execution process to distribute the image data on the content displayed by the electronic whiteboard 14 to the transmission destinations that are associated with the attendees in accordance with the result of the transmission destination addition process in Step S82.

Figure 22:
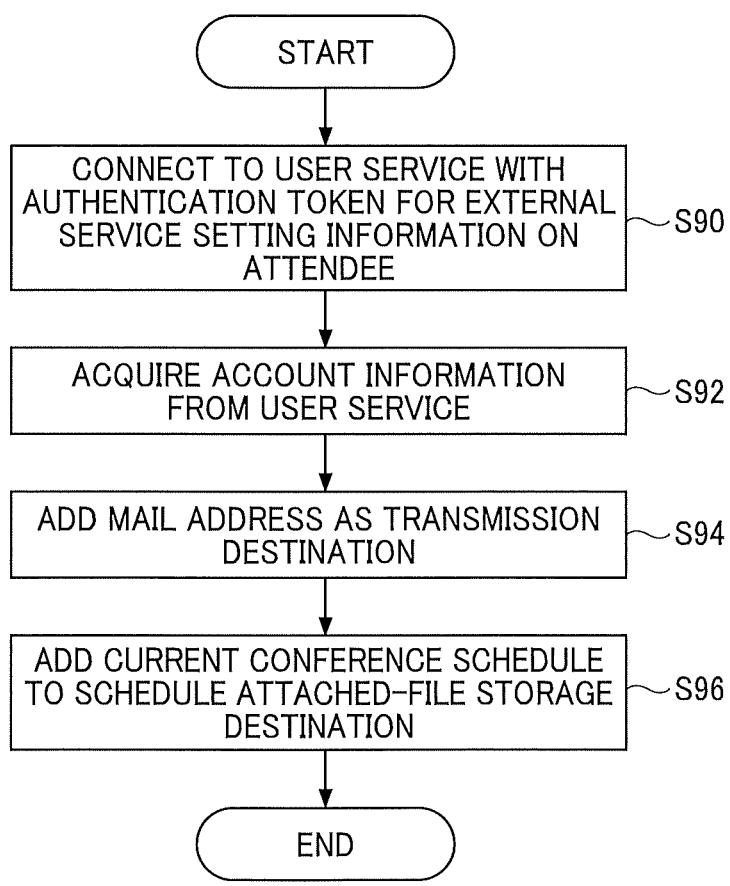
FIG. 22 is a flowchart illustrating an example of a transmission destination addition process according to the first embodiment.

In Step S82 of FIG. 21, the transmission destination addition process is performed in the procedure illustrated in for example FIG. 22. FIG. 22 is a flowchart illustrating an example of the transmission destination addition process. The transmission destination addition process illustrated in FIG. 22 is performed on all the attendees included in the attendee management information list.

In Step S90, the collective distributor 42 designates an attendee included in the attendee management information list and requests the external service setting information from the attendee manager 44. The attendee manager 44 acquires the external service setting information on the designated attendee from the external service setting information unit 20. The attendee manager 44 provides the collective distributor 42 with the external service setting information requested by the collective distributor 42 with the designated attendee.

In Step S92, the collective distributor 42 uses the external service authentication token for the designated attendee's external service setting information to acquire the designated attendee's account information from the user service 30. In Step S94, the collective distributor 42 adds the mail address of the acquired account information as a transmission destination of the designated attendee.

In Step S96, the collective distributor 42 adds the current schedule information on the scheduled conference as a transmission destination when the storage setting for the schedule information in the schedule service 32 is valid. Thus, according to the present embodiment, it is possible to facilitate the distribution of a work of the conference via the schedule information in the schedule service 32.

Figure 23:
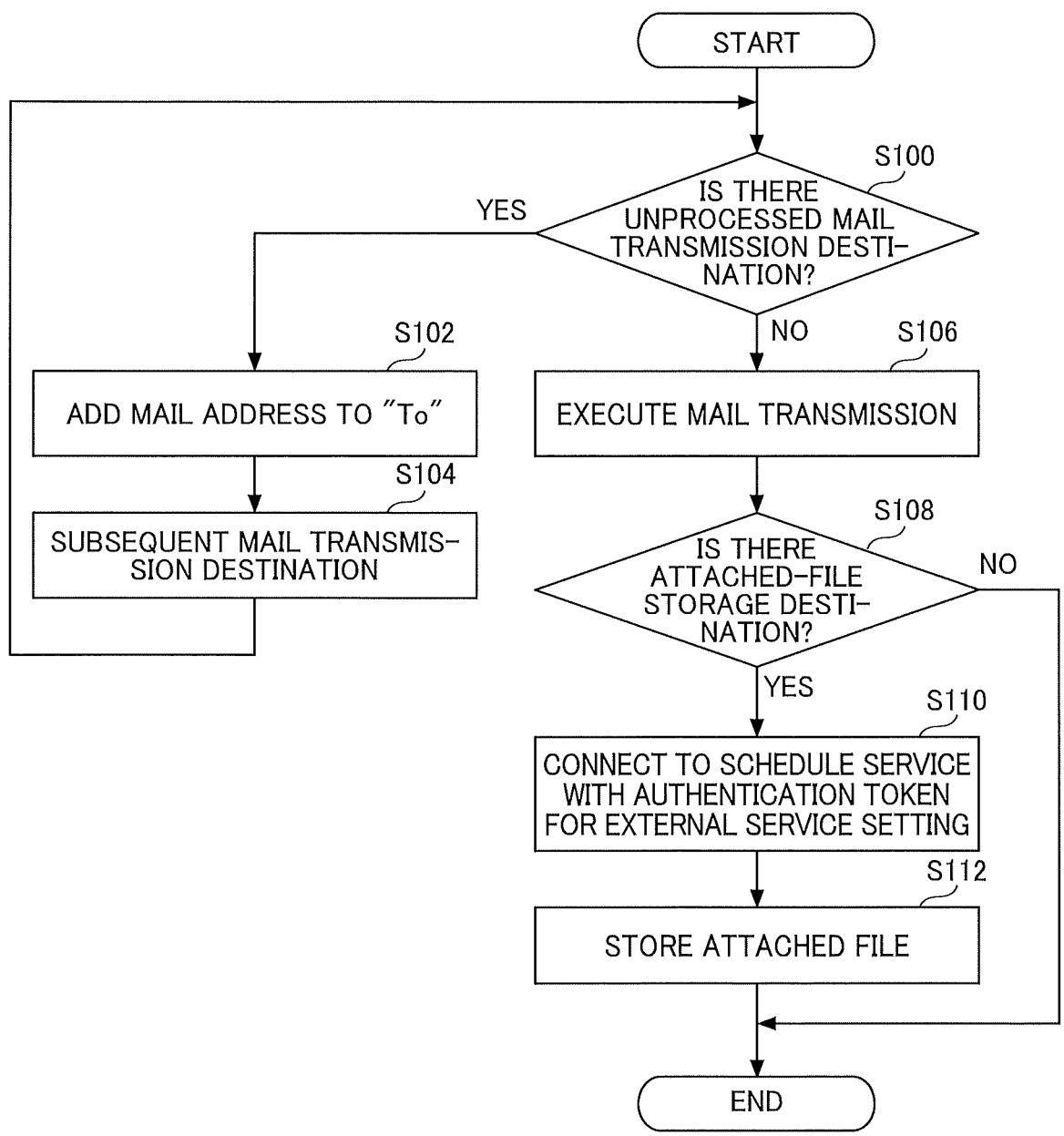
FIG. 23 is a flowchart illustrating an example of a full transmission execution process according to the first embodiment.

In Step S88 of FIG. 21, the full transmission execution process is performed in the procedure illustrated in for example FIG. 23. FIG. 23 is a flowchart illustrating an example of the full transmission execution process. During the full transmission execution process illustrated in FIG. 23, the image data on the content displayed by the electronic whiteboard 14 is distributed to the transmission destinations that are associated with the attendees in accordance with the result of the transmission destination addition process illustrated in FIG. 22.

The collective distributor 42 repeatedly performs the process from Steps S100 to S104 on all the mail addresses included in the transmission destinations on the distribution screen 1020 as a result of the transmission destination addition process illustrated in FIG. 22 so as to add the mail addresses to the destination (To) for the image data on the content displayed by the electronic whiteboard 14. In Step S106, the collective distributor 42 transmits the image data on the content displayed by the electronic whiteboard 14 with the electronic mail to which all the mail addresses included in the transmission destinations on the distribution screen 1020 have been added as destinations.

In Step S108, the collective distributor 42 repeatedly performs the process from Steps S108 to S112 on the schedule information (attached-file storage destination) included in the transmission destination on the distribution screen 1020 as a result of the transmission destination addition process illustrated in FIG. 22.

In Step S110, the collective distributor 42 connects to the schedule service 32 with the authentication token for the external service setting information corresponding to the attached-file storage destination. In Step S112, the collective distributor 42 stores the image data on the content displayed by the electronic whiteboard 14 in the attached file storage destination in the connected schedule service 32 as illustrated in FIG. 24.

Figures 24, 25:
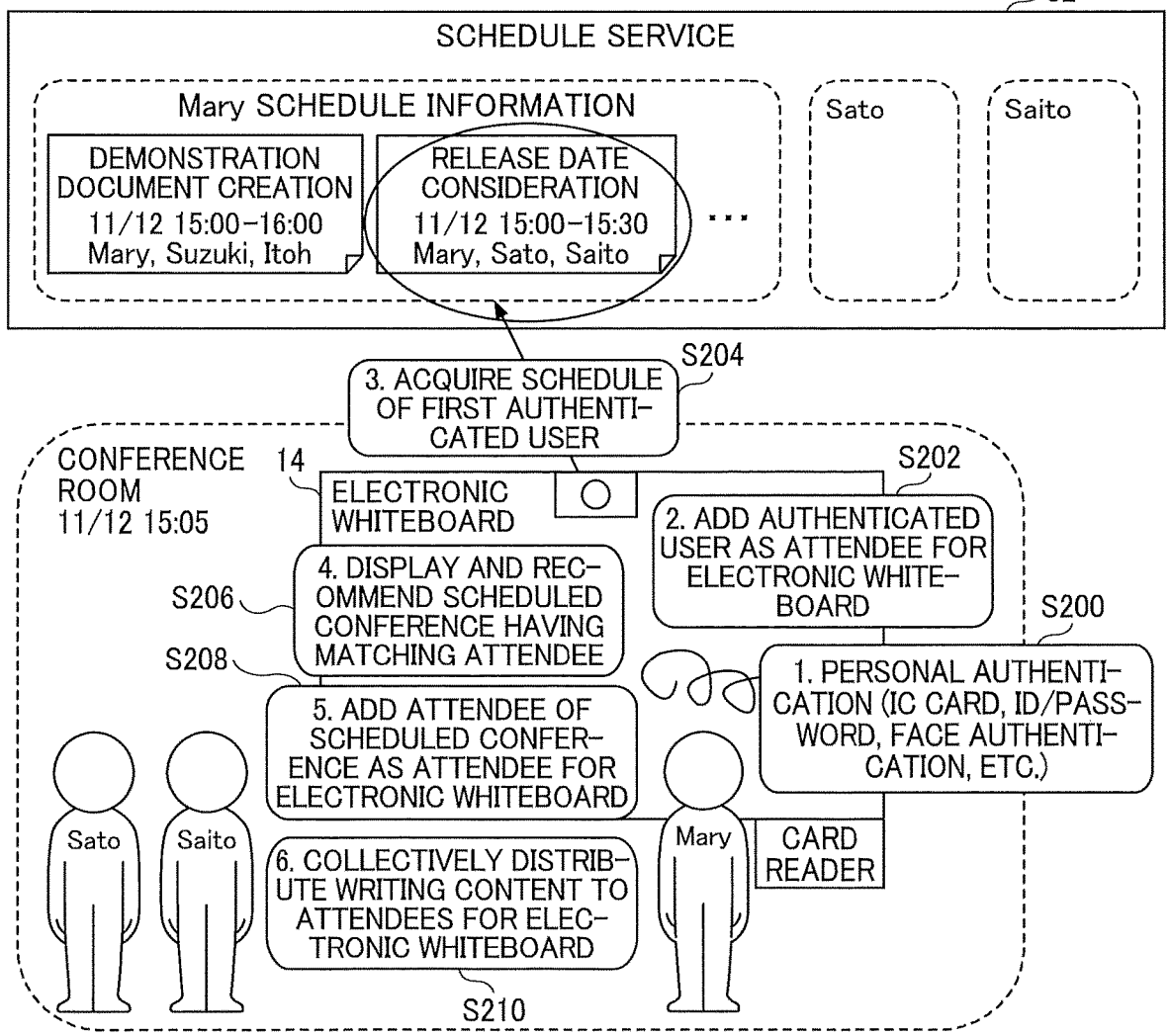
FIG. 24 is a table illustrating an example of schedule information in which the image data on content displayed by the electronic whiteboard is stored as an attached file according to the first embodiment.
FIG. 25 is a schematic view illustrating an example of the outline of processing performed by the information processing system according to a second embodiment of the present invention.

FIG. 24 is a table illustrating an example of the schedule information in which the image data on the content displayed by the electronic whiteboard 14 is stored as an attached file. FIG. 24 illustrates an example where the image data on the content displayed by the electronic whiteboard 14 is stored as an attached file for the scheduled conference with the schedule ID "sch-1".

To store the attached file for the scheduled conference with the schedule ID "sch-1", the external service setting information with the external service setting ID "connect1a" corresponding to the user ID "office1" of the organizer for the scheduled conference is used.

The collective distributor 42 uses the authentication token for the external service included in the external service setting information to connect to the schedule service 32 and additionally stores the attached file for the scheduled conference. As a result, in the schedule information "sch-1" in FIG. 24, "meeting with company A_20100405.pdf" is additionally stored as an attached file.

As described above, the full transmission execution process illustrated in FIG. 23 enables the collective transmission to the different mail addresses of the attendees in the external service group system 12. Furthermore, it is possible to store an attached file in the schedule information different for each scheduled conference.

As described above, according to the first embodiment, the conference to be started may be suggested based on the scheduled conference of the conference organizer, and the expected attendees in the schedule information on the scheduled conference, which is set as the conference to be started by the organizer, may be added as attendees of the conference. Thus, according to the first embodiment, in order to collectively distribute a conference material to all the attendees who have participated in the conference using the electronic whiteboard 14, it is possible to reduce the time-consuming settings for collectively distributing a conference material to all the attendees of the conference.

Second Embodiment

According to the first embodiment, the conference to be started is suggested based on the current time and the start time and the period of the scheduled conference included in the schedule information on the organizer. According to a second embodiment of the present invention, in addition to the details described in the first embodiment, the conference to be started is suggested based on a result of the comparison between the attendee who has been authenticated by the electronic whiteboard 14 and the expected attendees of the scheduled conference. As the second embodiment is the same as the first embodiment except for a part thereof, the description for the same part is omitted as appropriate.

FIG. 25 is a schematic view illustrating an example of the outline of processing performed by the information processing system 1 according to the second embodiment. In Step S200, the attendee of the conference undergoes personal authentication for the electronic whiteboard 14. The personal authentication may be executed by using an authentication method for voluntary authentication by the attendee, such as IC card authentication or ID/password authentication, or by using an authentication method for automatic authentication of the attendee, such as face authentication.

In Step S202, the electronic whiteboard 14 adds the user having undergone the personal authentication to the attendee management information list as an attendee of the conference. In Step S204, the electronic whiteboard 14 acquires, from the schedule service 32, the schedule information on the first user (e.g., the organizer) having undergone the personal authentication. The schedule information includes information such as the start time and the period of the scheduled conference and the expected attendees.

In Step S206, the electronic whiteboard 14 first determines a scheduled conference whose start time and period matches the current time. As a result, when there is one appropriate scheduled conference, the scheduled conference is suggested (displayed to be recommended). When there are two or more appropriate scheduled conferences, the scheduled conference including more authenticated attendees as expected attendees is displayed to be recommended.

In Step S208, for example, when the scheduled conference, which is displayed to be recommended, is set as the conference to be held using the electronic whiteboard 14 by the organizer, the electronic whiteboard 14 adds an expected attendee of the scheduled conference, which is set as the conference to be held, to the attendee management information list as an attendee of the conference to be held using the electronic whiteboard 14. Then, in Step S210, the electronic whiteboard 14 collectively distributes (collectively transmits) the image data on the displayed content (writing content) to the attendees of the conference.

The system configuration and the hardware configuration in the second embodiment are the same as those in the first embodiment. Although the functional configuration is the same as that in FIG. 4, the account information in FIG. 5, the schedule information in FIG. 6, the user information list in FIG. 7, the external service setting information in FIG. 8, and the attendee management information list in FIG. 9 are replaced with those in FIGS. 26 to 30 for the description.

The attendee manager 44 manages the attendees of the conference in, for example, an attendee management information list illustrated in FIG. 30. FIG. 30 is a table illustrating an example of the attendee management information list. The attendee management information list illustrated in FIG. 30 includes the user ID of the attendee and the information indicating whether the attendee with the user ID is the organizer. FIG. 30 illustrates an example where the attendees with the user IDs "user001", "user002", and "user003" have been authenticated.

For example, the attendee manager 44 uses the identification information read by the IC card detector 48 to identify the user information from the user information list illustrated in FIG. 28 and stores the user ID of the identified user information as the user ID of the attendee in the attendee management information list illustrated in FIG. 30.

The conference schedule setting unit 40 includes a user interface to set a scheduled conference. The conference schedule setting unit 40 communicates with the schedule service 32 to acquire the schedule information illustrated in FIG. 27, suggests the scheduled conference of the organizer, and prompts the user to select the scheduled conference so that the user may set the scheduled conference.

For example, the conference schedule setting unit 40 suggests a scheduled conference whose "start time and period" are close to the current time among the organizer's scheduled conferences of the day. When there are scheduled conferences whose "start time and period" are close to the current time, the conference schedule setting unit 40 compares the expected attendees of the scheduled conference with the attendees added to the attendee management information list illustrated in FIG. 30 and suggests the scheduled conference with a higher matching rate.

The matching rate is calculated by using, for example, the following Formula (1). The number of unexpected attendees in Formula (1) is the number of attendees that are not included in the expected attendees but are added to the attendee management information list.

$$\text{The matching rate (\%)} = \text{The number of matching attendees}/\text{The number of expected attendees} \times 100 - \text{The number of unexpected attendees}/\text{The number of expected attendees} \times 100 \qquad \text{Formula (1)}$$

For example, when there are the scheduled conferences with the schedule IDs "sch-1" and "sch-2" illustrated in FIG. 27 as scheduled conferences whose "start time and period" are close to the current time, the conference schedule setting unit 40 calculates the matching rate by using Formula (1).

The scheduled conference with the schedule ID "sch-1" in FIG. 27 has the expected attendees "user001", "user004", and "user005". The attendee management information list illustrated in FIG. 30 has the attendees "user001", "user002", and "user003". Thus, the number of matching attendees is "1", the number of expected attendees is "3", the number of unexpected attendees is "2", and the matching rate is approximately "26.7%".

The scheduled conference with the schedule ID "sch-2" in FIG. 27 has the expected attendees "user001", "user002", and "user003". The attendee management information list illustrated in FIG. 30 has the attendees "user001", "user002", and "user003". Therefore, the number of matching attendees is "3", the number of expected attendees is "3", the number of unexpected attendees is "0", and the matching rate is "100%".

Thus, in the case of the schedule information illustrated in FIG. 27 and the attendee management information list illustrated in FIG. 30, the conference schedule setting unit 40 suggests the scheduled conference with the schedule ID "sch-2" having a higher matching rate.

Processing

The information processing system 1 according to the second embodiment holds a conference using the electronic whiteboard 14 in, for example, the procedure described below. In the primary usage example described here, a conference is held by using the electronic whiteboard 14, and the image data on the content displayed by the electronic whiteboard 14 is collectively distributed to the attendees of the conference.

Figure 31:
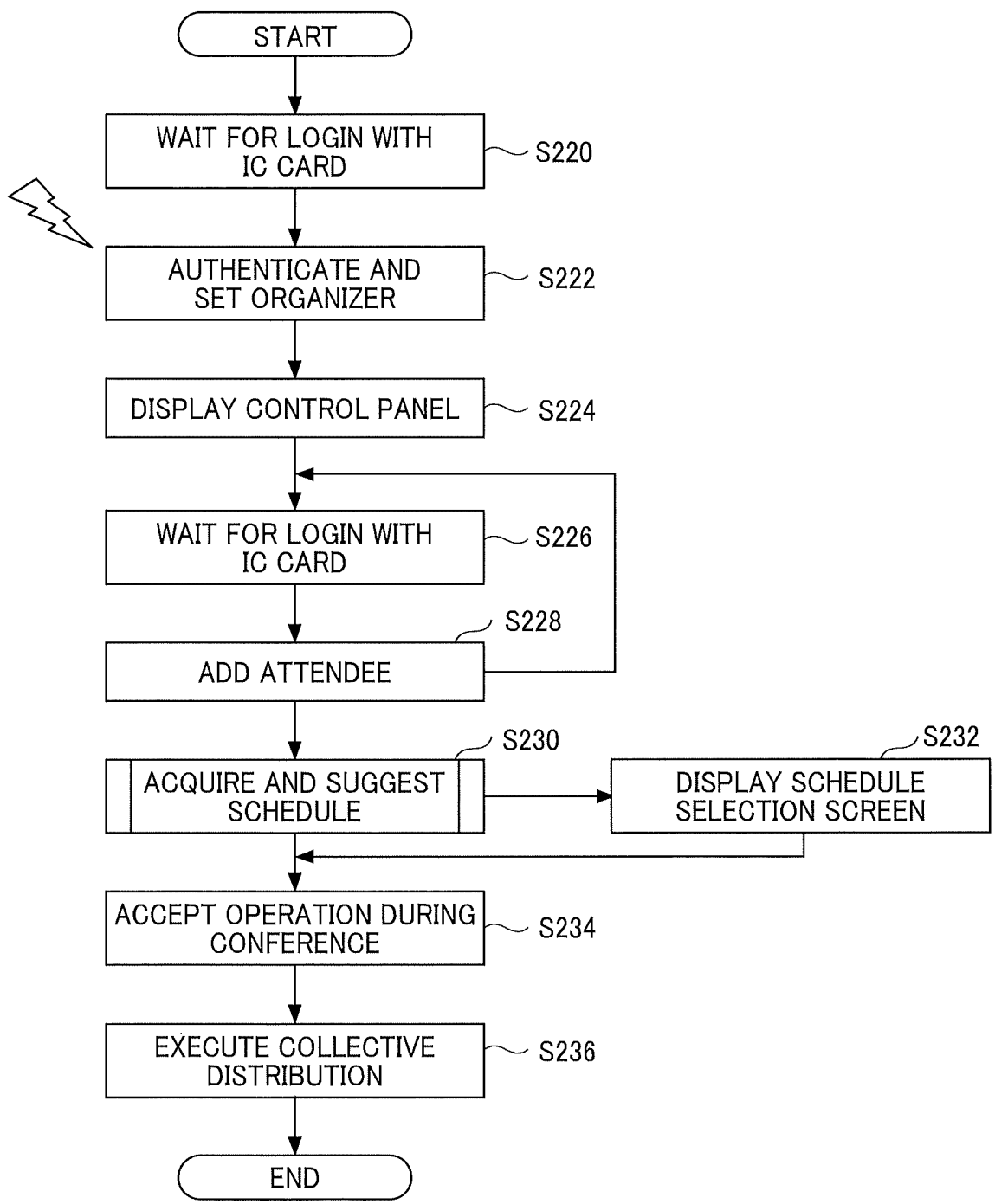
FIG. 31 is a flowchart illustrating an example of the flow of a conference using the electronic whiteboard according to the second embodiment.

FIG. 31 is a flowchart illustrating an example of the flow of a conference using the electronic whiteboard 14. In Step S220, the electronic whiteboard 14 is activated to wait for the login using for example the IC card 700. The organizer of the conference holds the IC card 700 of his/her own over the IC card detector 48.

When the IC card detector 48 detects the IC card 700, the electronic whiteboard 14 identifies the user information from the identification information read from the IC card 700 and authenticates and sets the user as the organizer in Step S222. The authentication and setting in Step S222 may be the ID/password authentication or the face authentication.

Figure 32:
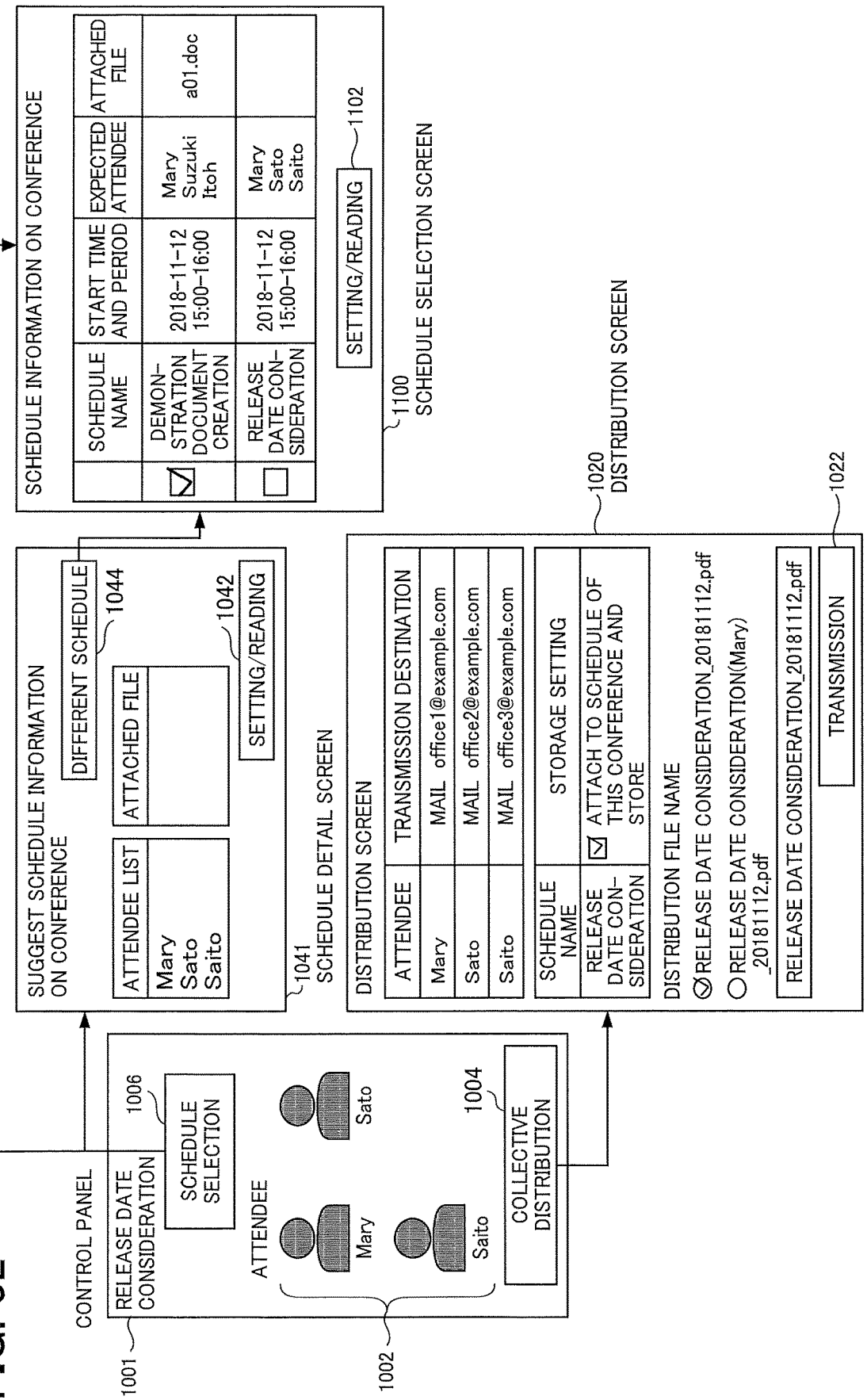
FIG. 32 is a schematic view illustrating an example of an UI displayed by the electronic whiteboard according to the second embodiment.

In Step S224, the electronic whiteboard 14 displays, for example, a control panel 1001 illustrated in FIG. 32 as a UI. FIG. 32 is a schematic view illustrating an example of the UI displayed by the electronic whiteboard 14. The control panel 1001 illustrated in FIG. 32 displays the attendee list 1002, the collective distribution button 1004, and a schedule selection button 1006. The user displayed in the attendee list 1002 is managed as an attendee of the conference, and the image data on the content displayed by the electronic whiteboard 14 is distributed to the user. On the control panel 1001 displayed in Step S224, the organizer is displayed in the attendee list 1002.

In Step S226, the user other than the organizer also holds the IC card 700 of his/her own over the IC card detector 48. When the IC card 700 is detected, the electronic whiteboard 14 identifies the user information from the identification information read from the IC card 700 and authenticates and sets the user as the attendee of the conference in Step S228.

When the schedule selection button 1006 on the control panel 1001 is pressed, the electronic whiteboard 14 proceeds to Step S230. The electronic whiteboard 14 acquires the schedule information on the organizer from the schedule service 32. The schedule information includes information such as the start time and the period of the scheduled conference and the expected attendees.

The electronic whiteboard 14 determines a scheduled conference whose start time and period match the current time. When there is one appropriate scheduled conference, the electronic whiteboard 14 suggests the scheduled conference on a schedule detail screen 1041 illustrated in FIG. 32. When there are two or more appropriate scheduled conferences, the electronic whiteboard 14 suggests the scheduled conference having a higher matching rate calculated by Formula (1) on the schedule detail screen 1041 illustrated in FIG. 32.

When the suggested scheduled conference is not appropriate, the administrator presses a different schedule button 1044 on the schedule detail screen 1041. When the different schedule button 1044 is pressed, the electronic whiteboard 14 displays a schedule selection screen 1100 illustrated in FIG. 32 so as to prompt the administrator to select a scheduled conference in Step S232. The organizer may press the setting/reading button 1042 on the schedule detail screen 1041 or a setting/reading button 1102 on the schedule selection screen 1100 to set the scheduled conference as the conference to be started.

The electronic whiteboard 14 adds, to the attendee management information list illustrated in FIG. 30, an attendee who has not been added to the attendee management information list among the expected attendees of the scheduled conference set as the conference to be started. The electronic whiteboard 14 acquires, as a conference material, the attached file of the scheduled conference set as the conference to be started. After the organizer sets the conference to be started, the electronic whiteboard 14 reads and displays the attached file in accordance with the set scheduled conference.

In Step S234, during the conference, the electronic whiteboard 14 accepts the user's operation, such as writing, on the electronic whiteboard 14 and updates the displayed content. When the pressing on the collective distribution button 1004 is detected, the electronic whiteboard 14 displays the distribution screen 1020 illustrated in FIG. 32 and, in response to the pressing on the transmission button 1022, collectively distributes the image data on the content displayed by the electronic whiteboard 14 to the attendees of the conference in Step S236.

Figure 33:
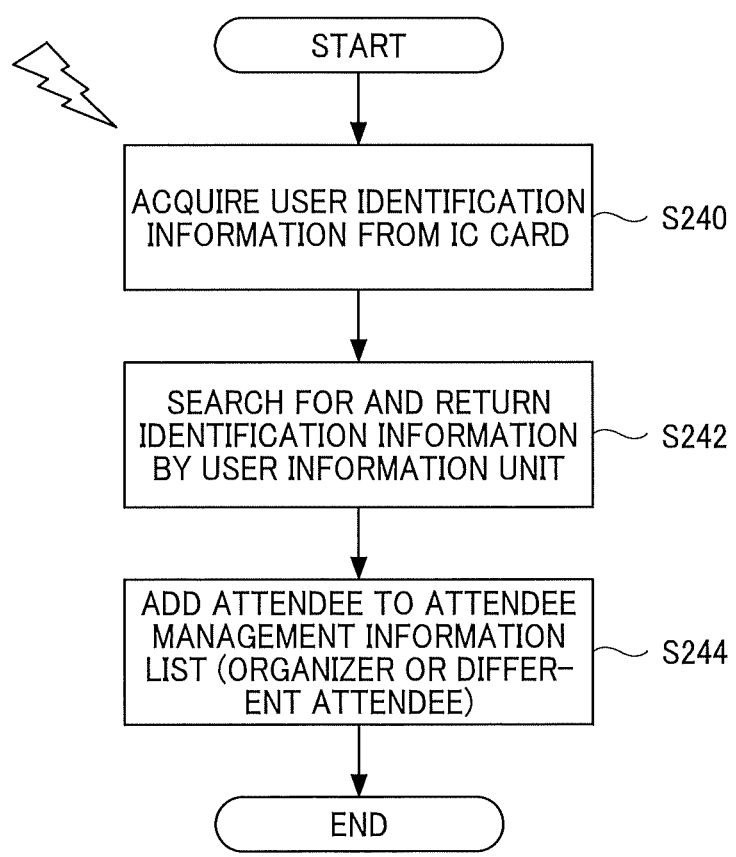
FIG. 33 is a flowchart illustrating an example of the process to authenticate and set the organizer or the attendee according to the second embodiment.

In Step S222, the organizer is authenticated and set in the procedure illustrated in for example FIG. 33. FIG. 33 is a flowchart illustrating an example of the process to authenticate and set the organizer or the attendee. FIG. 33 illustrates the process after the IC card detector 48 of the electronic whiteboard 14 detects the IC card 700 and reads the identification information from the IC card 700.

In Step S240, the attendee manager 44 acquires the identification information read from the IC card 700 by the IC card detector 48. In Step S242, the attendee manager 44 refers to the user information list illustrated in FIG. 28 and identifies the user with the identification information acquired in Step S240 from the user information list illustrated in FIG. 28. In Step S244, the attendee manager 44 manages the identified user as the organizer and adds the user to the attendee list 1002 in Step S244.

After the IC card detector 48 detects the IC card 700 of "Mary Smith" illustrated in the user information list in FIG. 28, for example, the IC card detector 48 reads the identification information "ICCARD-123" from the IC card 700. In step S240, the attendee manager 44 acquires the identification information "ICCARD-123" from the IC card detector 48. In Step S242, the attendee manager 44 makes an inquiry to the external service setting information unit 20 and the user information unit 22 of the user information server device 10 based on the acquired identification information "ICCARD-123".

The user information unit 22 executes search using the inquired identification information "ICCARD-123", identifies the user information with the user ID "user001", and returns the user information to the attendee manager 44 of the electronic whiteboard 14. The external service setting information unit 20 executes search using the identified user ID "user001", identifies the external service setting information "connect1a" illustrated in FIG. 29, and returns the external service setting information "connect1a" to the attendee manager 44 of the electronic whiteboard 14.

In Step S244, the attendee manager 44 may manage the user with the user ID "user001" as the organizer, add the user to the attendee list 1002, and manage the external service setting information "connect1a" on the user with the user ID "user001". Thus, the conference organizer "Mary Smith" is registered in the attendee manager 44, and the attendee management information list illustrated in FIG. 30, the user information with the user ID "user001" illustrated in FIG. 28, and the external service setting information with the external service setting ID "connect1a" illustrated in FIG. 29 are acquired.

In Step S230 of FIG. 31, a schedule is acquired and suggested in the procedure illustrated in for example FIG. 15. In Step S44 of FIG. 15, the schedule suggestion process is performed in, for example, the procedure illustrated in FIG. 16. In Step S50 of FIG. 16, the conference schedule setting unit 40 extracts a suggestion schedule for suggesting the conference to be started from the organizer's scheduled conferences of the day acquired in Step S40 as illustrated in FIG. 34.

Figure 34:
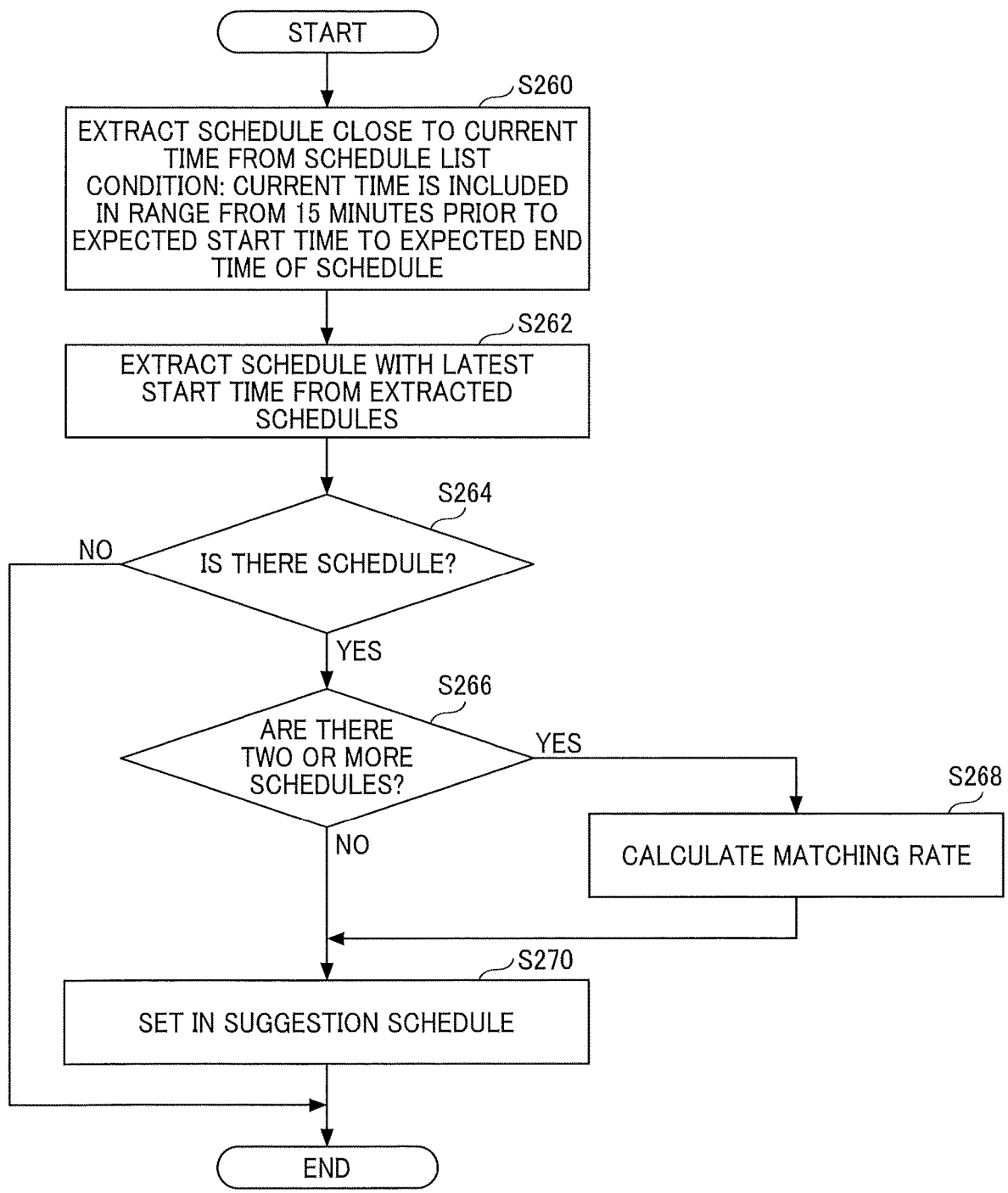
FIG. 34 is a flowchart illustrating an example of a suggestion schedule extraction process according to the second embodiment.

FIG. 34 is a flowchart illustrating an example of the suggestion schedule extraction process. In Step S260, the conference schedule setting unit 40 extracts the scheduled conference whose "start time and period" are close to the current time from the organizer's scheduled conferences of the day acquired in Step S40. As there may be a plurality of scheduled conferences extracted in Step S260, the conference schedule setting unit 40 extracts the scheduled conference with the latest expected start time from the scheduled conferences extracted in Step S262.

In Step S264, the conference schedule setting unit 40 determines whether there is a scheduled conference extracted in Step S262. When it is determined that there is a scheduled conference extracted in Step S262 (Yes in Step S264), the conference schedule setting unit 40 determines whether there are two or more scheduled conferences in Step S266. When it is determined that there are two or more scheduled conferences (Yes in Step S266), the conference schedule setting unit 40 calculates the matching rate by using, for example, Formula (1) in Step S268.

When it is determined that there is one scheduled conference extracted in Step S262 (No in Step S266), the conference schedule setting unit 40 sets the scheduled conference to the suggestion schedule in Step S270. When it is determined that there are two or more scheduled conferences that are extracted in Step S262 (Yes in Step S266), the conference schedule setting unit 40 sets the scheduled conference with the highest matching rate calculated in Step S268 in the suggestion schedule. When there are a plurality of scheduled conferences with the highest matching rate calculated in Step S268, no suggestion schedule may be provided.

Referring back to Step S52 in FIG. 16, when there is a suggestion schedule extracted in Step S50, the conference schedule setting unit 40 displays the schedule detail screen 1041 illustrated in FIG. 32 to suggest the scheduled conference in Step S54.

When the setting/reading button 1042 is pressed, the conference schedule setting unit 40 adds the expected attendees of the suggested scheduled conference to the attendee management information list illustrated in FIG. 30 in Step S56. In Step S58, the conference schedule setting unit 40 acquires the attached file for the suggested scheduled conference from the schedule service 32, displays the attached file on the writing display unit 46, and notifies the collective distributor 42 of the file name (distribution file name) of the attached file.

In Step S56 in FIG. 16, the conference schedule setting unit 40 notifies the attendee manager 44 of the expected attendees of the suggested scheduled conference to add the expected attendees as attendees of the conference to the attendee management information list illustrated in FIG. 30 in, for example, the procedure illustrated in FIG. 19.

In the above-described procedure, according to the present embodiment, the organizer's schedule information registered in the schedule service 32 may be set and read as a scheduled conference for the electronic whiteboard 14, whereby the attendee who has not been authenticated may be added as an attendee of the conference to the attendee management information list illustrated in FIG. 30.

In Step S236 in FIG. 31, the image data on the content displayed by the electronic whiteboard 14 is collectively distributed to the attendees of the conference as described referring to FIGS. 21 to 23. The collective distributor 42 connects to the schedule service 32 with the authentication token for the external service setting information corresponding to the attached file storage destination. The collective distributor 42 stores the image data on the content displayed by the electronic whiteboard 14 in the attached file storage destination in the connected schedule service 32 as illustrated in FIG. 35.

FIG. 35 is a table illustrating an example of the schedule information in which the image data on the content displayed by the electronic whiteboard 14 is stored as an attached file. FIG. 35 illustrates an example in which the image data on the content displayed by the electronic whiteboard 14 is stored as an attached file for the scheduled conference with the schedule ID "sch-2".

To store the attached file for the scheduled conference with the schedule ID "sch-2", the external service setting information with the external service setting ID "connect1a" corresponding to the user ID "office1" of the organizer for the scheduled conference is used.

The collective distributor 42 uses the authentication token for the external service included in the external service setting information to connect to the schedule service 32 and additionally store the attached file for the scheduled conference. As a result, in the schedule information "sch-2" in FIG. 35, "release date consideration 20181112.pdf" is additionally stored as an attached file.

As described above, in Step S236, it is possible to execute the collective transmission to the different mail addresses of the attendees in the external service group system 12. Furthermore, it is possible to store an attached file in schedule information different for each scheduled conference.

As described above, according to the second embodiment, even when it is difficult to narrow down the scheduled conferences to be suggested based on the current time, it is possible to narrow down the scheduled conferences to be suggested based on the matching rate between the expected attendees of the scheduled conference and the attendees authenticated by the electronic whiteboard 14, whereby the conference to be started may be suggested to the organizer.

Thus, according to the second embodiment, it is possible to reduce the time-consuming settings for collectively distributing a conference material to all the attendees who have participated in the conference using the electronic whiteboard 14.

Third Embodiment

According to the second embodiment, the conference to be started is suggested when the schedule selection button 1006 of the control panel 1001 is pressed, based on a result of the comparison between the attendees authenticated by the electronic whiteboard 14 and the expected attendees of the scheduled conference in addition to the details in the first embodiment. According to a third embodiment of the present invention, the conference to be started is suggested when the scheduled conference to be suggested is narrowed down to the single scheduled conference. As the third embodiment is the same as the second embodiment except for a part thereof, the description for the same part is omitted as appropriate.

Processing

The information processing system 1 according to the third embodiment holds a conference using the electronic whiteboard 14 in for example the procedure described below. In the primary usage example described here, a conference is held by using the electronic whiteboard 14, and the image data on the content displayed by the electronic whiteboard 14 is collectively distributed to the attendees of the conference.

Figure 36:
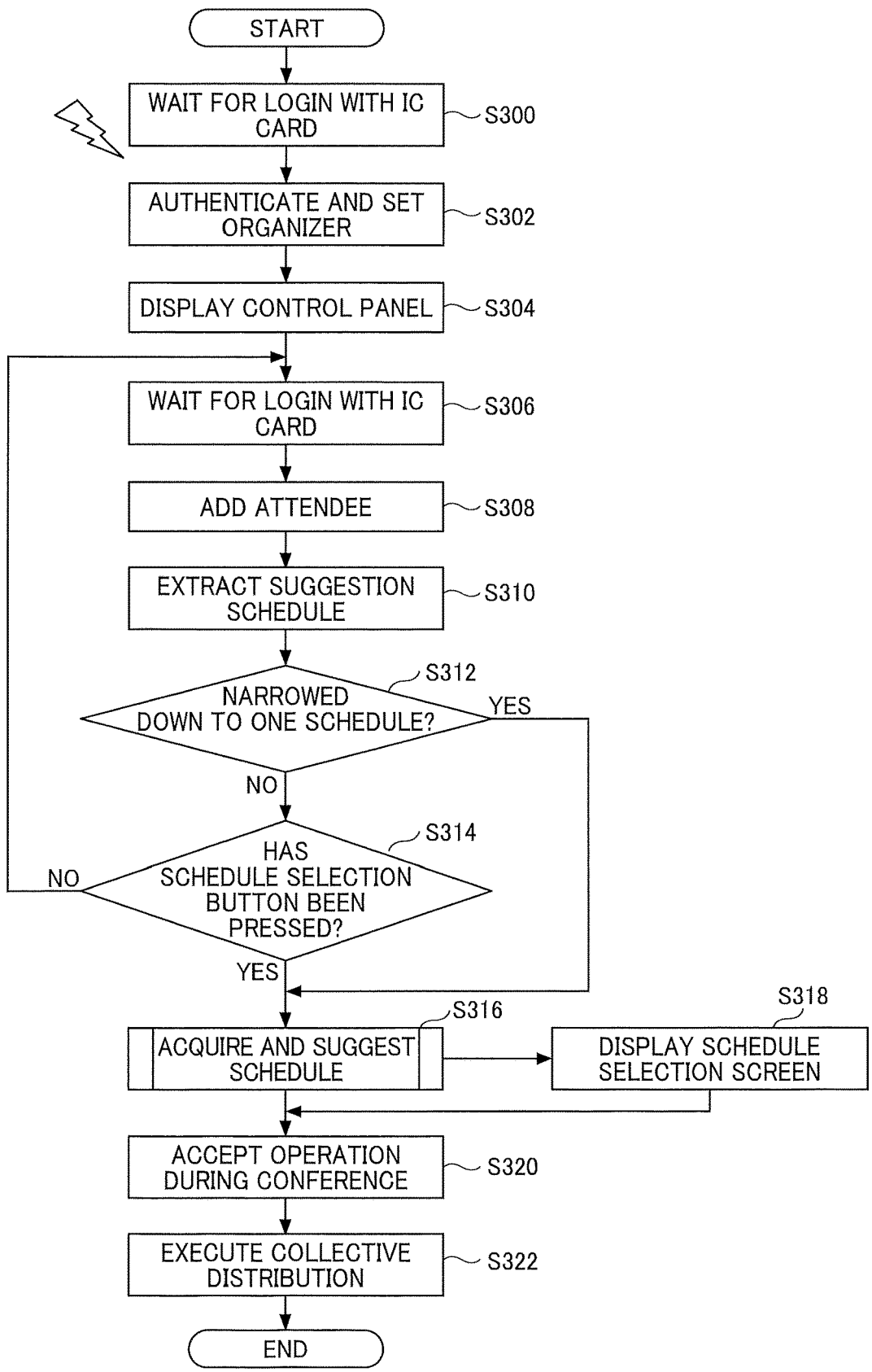
FIG. 36 is a flowchart illustrating an example of the flow of a conference using the electronic whiteboard according to a third embodiment of the present invention.

FIG. 36 is a flowchart illustrating an example of the flow of a conference using the electronic whiteboard 14. In Step S300, the electronic whiteboard 14 is activated to wait for the login using for example the IC card 700. The organizer of the conference holds the IC card 700 of his/her own over the IC card detector 48.

When the IC card detector 48 detects the IC card 700, the electronic whiteboard 14 identifies the user information from the identification information read from the IC card 700 and authenticates and sets the user as the organizer in Step S302. The authentication and setting in Step S302 may be the ID/password authentication or the face authentication. In the case of the face authentication, instead of the IC card detector 48, for example a camera is used to capture the user's face and use the image of the captured user's face so as to execute authentication.

In Step S304, the electronic whiteboard 14 displays, for example, a control panel 1000A illustrated in FIG. 37A as a UI. FIGS. 37A to 37D are schematic views illustrating examples of the UI displayed by the electronic whiteboard 14. The user displayed in the attendee list 1002 on the control panel 1000A illustrated in FIG. 37A is "Mary" who is an attendee of the conference.

In Step S306, a user other than the organizer also holds the IC card 700 of his/her own over the IC card detector 48. In the example described here, "Sato" who is an example of the user other than the organizer holds the IC card 700 of his/her own over the IC card detector 48.

When the IC card 700 is detected, the electronic whiteboard 14 identifies the user information from the identification information read from the IC card 700 of the user "Sato" other than the organizer and authenticates and sets the user as an attendee of the conference in Step S308. The electronic whiteboard 14 displays, for example, a control panel 1000B illustrated in FIG. 37B as a UI.

In Step S310, the electronic whiteboard 14 performs the suggestion schedule extraction process illustrated in FIG. 34. In Step S312, the electronic whiteboard 14 determines whether the scheduled conferences have been narrowed down to one scheduled conference during the suggestion schedule extraction process in Step S310. When it is determined that the scheduled conferences have been narrowed down to the single scheduled conference (Yes in Step S312), the electronic whiteboard 14 proceeds to Step S316.

In Step S314, the electronic whiteboard 14 determines whether the schedule selection button 1006 has been pressed. When it is determined that the schedule selection button 1006 has been pressed (Yes in Step S314), the electronic whiteboard 14 proceeds to Step S316.

The electronic whiteboard 14 repeatedly performs the process from Steps S306 to S314 until it is determined that the scheduled conferences have been narrowed down the single scheduled conference during the suggestion schedule extraction process or until it is determined that the schedule selection button 1006 has been pressed.

The electronic whiteboard 14 proceeds to Step S316 when it is determined that the scheduled conferences have been narrowed down the single scheduled conference during the suggestion schedule extraction process or when it is determined that the schedule selection button 1006 has been pressed.

In Step S316, the electronic whiteboard 14 extracts the suggestion schedule as described above and displays the suggestion schedule on a schedule detail screen 1043 illustrated in FIG. 37C. When the suggested scheduled conference is not appropriate, the administrator presses the different schedule button 1044 on the schedule detail screen 1043 illustrated in FIG. 37C. When the different schedule button 1044 is pressed, the electronic whiteboard 14 displays the schedule selection screen 1100 illustrated in FIG. 32 to prompt the administrator to select a scheduled conference in Step S318.

The organizer may press the setting/reading button 1042 on the schedule detail screen 1043 illustrated in FIG. 37C to set the scheduled conference as the conference to be started. Here, the electronic whiteboard 14 may add the attendee "Saito", who has not been added to the attendee management information list among the expected attendees of the scheduled conference set as the conference to be started, to the attendee list 1002 on a control panel 1000D illustrated in FIG. 37D.

The electronic whiteboard 14 acquires the attached file for the scheduled conference, which is set as the conference to be started, as a conference material. After the organizer sets the conference to be started, the electronic whiteboard 14 reads and displays the attached file in accordance with the set scheduled conference.

In Step S320, during the conference, the electronic whiteboard 14 accepts the user's operation, such as writing, on the electronic whiteboard 14 and updates the displayed content. When the pressing on the collective distribution button 1004 is detected, the electronic whiteboard 14 displays the distribution screen 1020 illustrated in FIG. 32 and, in response to the pressing on the transmission button 1022, collectively distributes the image data on the content displayed by the electronic whiteboard 14 to the attendees of the conference in Step S322.

As described above, according to the third embodiment, the conference to be started may be suggested to the organizer when the scheduled conferences are narrowed down to be suggested. Thus, according to the third embodiment, it is possible to reduce the time-consuming settings for collectively distributing a conference material to all the attendees who have participated in the conference using the electronic whiteboard 14.

The present invention is not limited to the above embodiments that are described in detail. The present invention may be variously modified or changed without departing from the scope of the claims. The information processing system 1 described in the embodiments is an example. It is obvious that various system configuration examples are applicable depending on the application or the purpose.

Each of the functions according to the above-described embodiments may be implemented by one or more processing circuitries. The "processing circuitry" in the description includes a device such as a processor programmed to execute each function by using software, e.g., a processor implemented by an electronic circuitry, or an application specific integrated circuit (ASIC), a digital signal processor (DSP), an field programmable gate array (FPGA), or a conventional circuit module, which is designed to execute each function described above.

The group of devices described in the embodiments merely represents one of the computing environments for implementing the embodiments described herein.

In an embodiment, the user information server device 10 includes a plurality of computing devices such as server clusters. The computing devices are configured to communicate with each other via any type of communication link including the network 16, a shared memory, etc. to perform the processes disclosed in the description. Similarly, the electronic whiteboard 14 may include a plurality of computing devices configured to communicate with each other.

The user information server device 10 and the electronic whiteboard 14 may be configured to share various combinations of the processing steps described above. For example, the process executed by a predetermined unit may be performed by the electronic whiteboard 14. Similarly, the function of a predetermined unit may be performed by the electronic whiteboard 14. Each element of the user information server device 10 and the electronic whiteboard 14 may be combined into one server device or may be separated into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention may be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, personal digital assistant, mobile telephone (such as a WAP or 3G-compliant phone) and so on. Since the present invention may be implemented as software, each and every aspect of the present invention thus encompasses computer software implementable on a programmable device. The computer software may be provided to the programmable device using any conventional carrier medium (carrier means). The carrier medium includes a transient carrier medium such as an electrical, optical, microwave, acoustic or radio frequency signal carrying the computer code. An example of such a transient medium is a TCP/IP signal carrying computer code over an IP network, such as the Internet. The carrier medium may also include a storage medium for storing processor readable code such as a floppy disk, hard disk, CD ROM, magnetic tape device or solid state memory device.

The invention claimed is:

1. An information processing apparatus comprising circuitry configured to:
   in response to detection of information identifying a user, acquire schedule information on the user from an external service, using external service setting information associated with the information identifying the user;
   when the user is to set a schedule for using the information processing apparatus, suggest the user with a schedule for using the information processing apparatus based on a current time, to cause the user to set the schedule for using the information processing, apparatus;
   obtain information on an expected attendee registered for the schedule for using the information processing apparatus set by the user, based on the schedule information on the user; and
   transmit image data of an image being displayed on a display to the expected attendee,
   wherein, in response to detecting that there are two or more schedules of the user, each of the two or more schedules of the user being provided with an expected start time and an expected end time such that the current time is within a time period from a predetermined time before the expected start time to the expected end time, the circuitry determines, as the schedule for using the information processing apparatus for suggestion, a schedule of the user with a largest ratio of a number of expected attendees with identifying information currently detected by the circuitry, the expected attendees with the identifying information being registered for the schedule of the user, to a total number of expected attendees registered for the schedule of the user.

2. The information processing apparatus of claim 1, wherein the circuitry compares the expected start time and the expected end time of each of the two or more schedules of the user with the current time, and determines the schedule for using the information processing apparatus for suggestion based on a result of comparison.

3. The information processing apparatus of claim 1, wherein the circuitry determines the schedule for using the information processing apparatus for suggestion, in response to acceptance of an operation from the user.

4. The information processing apparatus of claim 1, wherein the circuitry transmits the image data of the image to the external service to cause the external service to store the image data as information additional to the schedule information on the user.

5. The information processing apparatus of claim 1, wherein the information identifying the user includes identification information read from a recording medium possessed by the user or information based on authentication using an image of a face of the user captured.

6. The information processing apparatus of claim 1, wherein the circuitry sets the user firstly detected and identified as an organizer and acquires the schedule information on the user set as the organizer.

7. An information processing system including an information processing apparatus, comprising circuitry configured to:
   in response to detection of information identifying a user, acquire schedule information on the user from an external service, using external service setting information associated with the information identifying the user;
   when the user is to set a schedule for using the information processing apparatus, suggest the user with a schedule for using the information processing apparatus based on a current time, to cause the user to set the schedule for using the information processing apparatus;
   obtain information on an expected attendee registered for the schedule for using the information processing apparatus set by the user, based on the schedule information on the user; and
   transmit image data of an image being displayed on a display to the expected attendee, wherein, in response to detecting that there are two or more schedules of the user, each of the two or more schedules of the user being provided with an expected start time and an expected end time such that the current time is within a time period from a predetermined time before the expected start time to the expected end time, the circuitry determines, as the schedule for using the information processing apparatus for suggestion, a schedule of the user with a largest ratio of a number of expected attendees with identifying information currently detected by the circuitry, the expected attendees with the identifying information being registered for the schedule of the user, to a total number of expected attendees registered for the schedule of the user.

8. An information processing, method executed by an information processing apparatus, the method comprising:

detecting information identifying a user;

acquiring schedule information on the user from an external service, using external service setting information associated with the information identifying the user;

suggesting the user with a schedule for using an information processing apparatus based on a current time, when the user is to set a schedule for using the information processing apparatus, to cause the user to set the schedule for using the information processing apparatus;

obtaining information on an expected attendee registered for the schedule for using the information processing apparatus set by the user, based on the schedule information on the user; and transmitting image data of an image being displayed on a display to the expected attendee, wherein, in, response to detecting that there are two or more schedules of the user, each of the two or more schedules of the user being provided with an expected start time and an expected end time such that the current time is within a time period from a predetermined time before the expected start time to the expected end time, the information processing apparatus determines, as the schedule for using the information processing apparatus for suggestion, a schedule of the user with a largest ratio of a number of expected attendees with identifying information currently detected by the circuitry, the expected attendees with the identifying information being registered for the schedule of the user, to a total number of expected attendees registered for the schedule of the user.

* * * * *